(12) United States Patent
Shinkawa

(10) Patent No.: US 6,327,164 B1
(45) Date of Patent: Dec. 4, 2001

(54) CHOPPER CIRCUIT, CHOPPER CIRCUIT CONTROL METHOD, CHOPPER-TYPE CHARGING CIRCUIT, ELECTRONIC DEVICE, AND TIMEKEEPING APPARATUS

(75) Inventor: Osamu Shinkawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/688,273

(22) Filed: Oct. 11, 2000

(30) Foreign Application Priority Data

| Oct. 15, 1999 | (JP) | 11-294426 |
| Aug. 28, 2000 | (JP) | 12-258044 |
| Sep. 22, 2000 | (JP) | 12-289620 |

(51) Int. Cl.$^7$ .................................................. H02M 7/00
(52) U.S. Cl. .......................................... 363/124; 363/132
(58) Field of Search ................................ 363/16, 17, 50, 363/56.02, 97, 98, 124, 131, 132

(56) References Cited

U.S. PATENT DOCUMENTS

| 4,514,686 | * | 4/1985 | Mayfield | 324/142 |
| 5,862,046 | * | 1/1999 | Farine et al. | 363/50 |
| 5,982,157 | | 11/1999 | Wattenhofer et al. | |
| 6,049,184 | * | 4/2000 | Uggla et al. | 318/434 |

FOREIGN PATENT DOCUMENTS

| 8-182368 | 7/1996 | (JP) . |
| 9-149685 | 6/1997 | (JP) . |
| 10-201250 | 7/1998 | (JP) . |
| 10-271708 | 10/1998 | (JP) . |
| 11-150988 | 6/1999 | (JP) . |
| 11-187666 | 7/1999 | (JP) . |
| 11-206031 | 7/1999 | (JP) . |
| 11-206132 | 7/1999 | (JP) . |

OTHER PUBLICATIONS

Switching Regulator Design Know How, Hasegawa Akira, pp. 16–19, 1985.

* cited by examiner

Primary Examiner—Matthew Nguyen
(74) Attorney, Agent, or Firm—Mark P. Watson

(57) ABSTRACT

A control circuit for controlling two N-channel FETs determines whether charging has ended by detecting that two P-channel FETs have been off for a prescribed amount of time, based on comparison results from two comparators and, if charging is decided to have ended, the two N-channel FETs are set to the off state for just a set amount of time.

34 Claims, 20 Drawing Sheets

CHARGING RATE (%)=(CHARGING CHARGE AMOUNT AT EACH CHOPPER FREQUENCY/CHARGING CHARGE AT 2 kHz) X 100

CASE OF LOW INPUT VOLTAGE
CHARGING RATE (%)=(CHARGING CHARGE AMOUNT AT EACH CHOPPER FREQUENCY/CHARGING CHARGE AT 1.8 kHz) X 100

CHOPPER CIRCUIT, CHOPPER CIRCUIT CONTROL METHOD, CHOPPER-TYPE CHARGING CIRCUIT, ELECTRONIC DEVICE, AND TIMEKEEPING APPARATUS

BACKGROUND OF THE INVENTION

1. Field of the Invention

The present invention relates to a chopper circuit, a chopper circuit control method, a chopper-type charging circuit, an electronic device, and a timekeeping apparatus.

2. Related Art

A chopper-type charging circuit is known as a charging circuit for charging a capacitor or a battery, with alternating current electrical power generated by an electrical generator.

FIG. 25 of the appended drawings is a circuit diagram of a chopper-type charging circuit of the past. This chopper-type charging circuit 1 is formed by an oscillator circuit 2, comparators COM1 and COM2, AND circuit 3, a large-capacitance capacitor 4, and P-channel FETs P1 and P2, N-channel FETs N1 and N2.

The oscillator circuit 2 outputs a clock signal CL. The comparator COM1 (COM2) performs a comparison of the voltages at output terminal A(B) of an alternating current electrical generator AG with a terminal voltage VDD of a power supply. The AND circuit 3 calculates the logical product of the output signal SP1 and SP2 of the comparator COM1 and COM2 and the clock signal CL. The large-capacitance capacitor 4 is for storing a charging current. P-channel FET P1 (P2) are on/off controlled by the output signals SP1(SP2) of the comparator COM1(COM2). N-channel FET N1 (N2) are on/off controlled by an output signal SN of the AND circuit 3.

A diode D1 is a parasitic diode of the P-channel FET P1. A diode D2 is a parasitic diode of the P-channel FET P2. A diode D3 is a parasitic diode of the N-channel FET N1. A diode D4 is a parasitic diode of the N-channel FET N2.

The operation of the chopper-type charging circuit is described below, with reference made to the timing diagram shown in FIG. 26.

In FIG. 26, the assumption is that until a time ta, the voltages on the output terminals A is equal to or less than the terminal voltage VDD and the voltages on the output terminals B is equal to or less than the terminal voltage VDD. Output signal SP1 of the comparator COM1 is held at a high level and output signal SP2 of the comparator COM2 is held at a high level. Thus both of the P-channel FETs P1 and P2 are in the off state.

At the time ta, when the clock signal CL rises from a low level to the high level, output signal SN of the AND circuit 3 changes to the high level. Thus both of the N-channel FETs N1 and N2 are placed in the on state. Accordingly a closed loop is formed by the alternating current generator AG and the N-channel FET N1 and the N-channel FET N2.

In the above case, the alternating current generator AG generates an electromotive force. For example, when the output terminal A reaches a positive potential with respect to the output terminal B. As shown by the arrow α in FIG. 25, a current i1 flows through a path from the alternating current generator AG, to the N-channel FET N1, and then to the N-channel FET N2.

At the time tb, when the clock signal CL falls to the low level, the output signal SN of the AND circuit 3 changes to the low level. Thus the N-channel FETs N1 and are placed in the off state, thereby cutting off the above-noted current path.

In the above case, because of the current that flows during the time when the clock signal CL is at the high level (hereinafter referred to as the shorted period), the inductance of a generator coil of the alternating current generator store up an energy. This energy raises the voltage of the output terminal A. Next at time tc, when the voltage of the terminal A is equal to or greater than the terminal voltage VDD of the large-capacitance capacitor 4, the output signal SP1 of the comparator COM1 changes to the low level, so that the P-channel FET P1 is placed in the on state.

As a result, as shown by the arrow β in FIG. 25, a current i2 flows through a current path from the diode D4 of the N-channel FET N2, to the alternating current generator AG, the P-channel FET P1, and then to the large-capacitance capacitor 4.

As the charging proceeds, energy stored in the inductance of the generator coil is gradually released, so that the charging current i2 gradually decreases. When the voltage of the output terminal A falls below the terminal voltage VDD on the large-capacitance capacitor 4, the output signal SP1 of the comparator COM1 changes to the high level, so that the P-channel FET P1 is placed in the off state, thereby cutting off the above-noted charging current path.

That is, until the voltage at the output terminal A falls below the terminal voltage VDD of the large-capacitance capacitor 4, the AND circuit 3 holds the N-channel FETs N1 and N2 in the off state, so that charging is continued. For this reason, when the amount of electricity generated by the alternating current generator AG is large, so that the amount of energy stored in the inductance of the generator coil is large, charging continues even after switching to the shorted period. Thus the charging time is long, so that it commensurately eats away the shorted period.

In the case in which the electromotive force of the alternating current generator AG is generated and the output terminal B reaches a potential that is positive with respect to the output terminal A. Thus the direction of the current i1 flowing during the above-noted shorted period reverses, so that the voltage of the output terminal B rises. As a result, the charging current i2 flows through the path from the diode D3 of the N-channel FET N1, the alternating current generator AG, the P-channel FET P2, and then the large-capacitance capacitor 4, resulting in the charging of the large-capacitance capacitor 4.

Thus, in a chopper-type charging circuit 1 of the past, by repeatedly performing shorting and voltage raise of the circuit in accordance with the clock signal. A chopper voltage that charges a large-capacitance capacitor 4 is generated from the electromotive force of an alternating current generator, which has a small, non-uniform amount of generated electricity. In the case in which the there is a large amount of energy stored in the inductance of the generator coil, or in which the input energy is large, the shorted period of the chopper is disabled, so that priority is given to charging by non-chopped operation. By performing charging by switching between chopper and non-chopped operation, it is possible to efficiently charge the large-capacitance capacitor.

In a chopper-type charging circuit 1 such as described above, if the amount of electrical generated by the alternating current generator is large, because the charging continues even after transition to the shorted period, so that there are an eatting away of the shorted period. For this reason, there are the problems of it not being possible to achieve sufficient storage of energy in the inductance of the generator coil, and of decreased charging efficiency.

While making the shorted period long can be envisioned as a method of achieving a sufficient shorted period. In particular in the case of an alternating current generator, the internal resistance of the generator causes a large loss in the current path during the shorted period, thereby resulting in a decrease in the charging efficiency.

In this case, although one method that can be envisioned is that of setting the shorted period duty cycle, which is the proportion of the shorted period in the chopper operation. In accordance with the amount of electricity generated, the detection of the amount of electricity generated by the alternating current generator requires the provision of a separate circuit to detect the charging current, thereby increasing the power consumption. In particular in the case of applying a chopper-type charging circuit to a wristwatch, in which the electrical generator is small, the amount of power consumed by the circuit to detect the charging current is a large proportion of the overall power consumption. This is undesirable from the standpoint of overall power consumption of the wristwatch.

SUMMARY OF THE INVENTION

The present invention provides a chopper circuit, a chopper circuit control method, a chopper-type charging circuit, and an electronic device or timekeeping apparatus incorporating these, which enable an increase in the charging efficiency without increasing the power consumption, even if there is a variation in the amount of electricity generated.

In accordance with an aspect of the present invention, there is provided a chopper circuit for generating a chopper voltage from electrical power of a power source, this chopper voltage being generated between a first line and a second line. The chopper circuit may have: a comparator for comparing a voltage of the first line with a voltage of an input terminal to which electrical power of the power source is supplied; a switching section for charging, provided between the first line and the input terminal, which, in the case in which a comparison result from the comparator indicates that the voltage of the input terminal is equal to or greater than a prescribed voltage, causes current to flow in one direction; a switching section for a closed loop, provided between the second line and the input terminal, having a switching element and a unidirectional element connected in parallel with the switching element, which causes current to flow in one direction; and a controller controlling the switching element, wherein the controller has a charging end determination section for determining an end of charging by detecting that the switching section for charging has been off for a given amount of time, based on a comparison result of the comparator, and a switching element controller, which, in a case in which a decision is made by the charging end determination section that charging has ended, places the switching element in an on state for a priorly established amount of time.

Preferably, the chopper circuit may further have a second controller, provided between the second line and another input terminal to which electrical power from the power source is supplied, which, in a case in which a voltage of the other input terminal exceeds a prescribed voltage, places the switching element in an off state.

It is preferable that the chopper circuit may have a second switching section for charging, connected in parallel with the switching section for a closed loop, wherein the second switching section for charging switches a connection state responsive to a voltage of the other input terminal to which electrical power from the power source is supplied.

The switching element controller may have: a time setting section for generating a signal which switches the switching element on, by dividing frequency of a clock signal; and a closed loop inhibiting circuit, which forcibly places the switching element in the off state from a time at which the switching section for charging is switched on until a time at which the charging end determination section decides that charging has ended, wherein in a case in which the charging end determination section decides that charging has ended, clock signal frequency division operation in the time setting section is reset, and the switching element is set on for only an amount of time set based on a frequency-divided signal generated by the time setting section.

The switching section for charging may have: a switching element controlled based on a comparison result of the comparator for electromotive force detection and a unidirectional element, connected in parallel with the switching element, which causes current to flow in one direction.

Preferably, the switching section for charging may be a diode.

Advantageously, the power source may be an electrical generator.

The aforementioned power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

The aforementioned first line is a high-voltage side line, and wherein the second line is a low-voltage side line.

The switching elements may be field-effect transistors while the unidirectional elements may be parasitic diodes of the field-effect transistors.

In accordance with another aspect of the present invention, there is provided a chopper circuit for generating a chopper voltage from electrical power of an alternating current power source, the chopper voltage being generated between a first line and a second line. The chopper circuit may have: a first comparator for comparing a voltage of the first line with a voltage of one input terminal to which electrical power of the alternating current power source is supplied; a first switching section, provided between the first line and the one input terminal, which, in a case in which a voltage of the one input terminal is equal to or greater than a prescribed voltage, causes current to flow in one direction; a second comparator for comparing a voltage of the first line with another input terminal to which electrical power of the alternating current power source is supplied; a second switching section, provided between the first line and the other input terminal, which, in a case in which a voltage of the other input terminal is equal to or greater than a prescribed voltage, causes current to flow in one direction; a third switching section, provided between the second line and the one input terminal, having a switching element and a unidirectional element connected in parallel with the switching element, which causes current to flow in one direction; a fourth switching section, provided between the second line and the other input terminal, having a switching element and a unidirectional element connected in parallel with the switching element, which causes current to flow in one direction; and a controller controlling the switching elements in the third and the fourth switching sections, wherein the controller comprises a charging end determination section for determining end of charging by detecting that the first and second switching sections have been off for a given amount of time, based on comparison results of the first and second comparators, and a switching element controller, which, in a case in which a decision is made by the charging end determination section that charging has ended, places the switching elements in the third and fourth switching sections in the on state for a priorly established amount of time.

In this aspect, the chopper circuit may further include; a second controller, provided between the second line and the other input circuit, which, in a case in which a voltage of the other input terminal is equal to or greater than a prescribed voltage, places the switching element in the third switching section in the on state; and a third controller, provided between the second line and the one input terminal, which, in a case in which a voltage of the one input terminal is equal to or greater than a prescribed voltage, places the switching element in the fourth switching section in the on state.

Furthermore, the chopper circuit may further include a fifth switching section connected in parallel with the third switching section, and a sixth switching section connected in parallel with the fourth switching section, wherein the fifth switching section switches a connection state responsive to a voltage of the other input terminal, and wherein the sixth switching section switches a connection state responsive to a voltage of the one input terminal.

The switching element controller may have: a time setting section for generating a signal that switches the switching elements of the third and fourth switching sections on, by frequency division of a clock signal; and a closed loop inhibiting section, which forcibly places the switching elements of the third and the fourth switching section in the off state from a time at which the first and the second switching sections are switched on until a time at which the charging end determination section decides that charging has ended, wherein in a case in which the charging end determination section decides that charging has ended, the clock signal frequency division operation is reset, and the switching elements in the third and the fourth switching section are set on for only an amount of time based on a frequency-divided signal generated by the time setting section.

The first switching section may include a switching element controlled based on a comparison result of the first comparator; and a unidirectional element connected in parallel to the switching element and causing current to flow in one direction, and wherein the second switching section may have a switching element controlled based on a comparison result of the second comparator, and a unidirectional element connected in parallel with the switching element and causing current to flow in one direction.

Preferably, the first and second switching sections may be diodes.

Advantageously, the alternating current power source may be an alternating current generator.

The aforementioned alternating current power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

The aforementioned first line is a high-voltage side line, and wherein the second line is a low-voltage side line.

The switching elements may be field-effect transistors while the unidirectional elements may be parasitic diodes of the field-effect transistors.

In accordance with a further aspect of present invention, a method for controlling a chopper circuit including a comparator circuit for comparing a voltage of a first line with a voltage of an input terminal to which electrical power of a power source is supplied; a switching circuit for charging provided between the first line and the input terminal, which, in a case in which a comparison result from the comparator circuit is that the voltage of the input terminal is equal to or greater than a prescribed voltage, causes current to flow in one direction; a switching circuit for a closed loop, provided between a second line and the input terminal, having a switching element and a unidirectional element connected in parallel with the switching element, which causes current to flow in one direction; and a control circuit for controlling the switching element, wherein a chopper voltage is generated from electrical power of the power source, the chopper voltage being generated between the first line and the second line. The method may comprise: deciding, on the basis of a comparison result from the comparator circuit, whether or not the switching circuit for charging has been off for a given amount of time; and activating the switching element of the switching circuit for the closed loop into the on state for a predetermined time period when the decision is affirmative.

The aforementioned alternating current power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

In accordance with still another of the present invention; there is provided a method for controlling a chopper circuit including a comparator circuit for comparing a voltage of a first line with a voltage of an input terminal to which electrical power of a power source is supplied; a switching circuit for charging, provided between the first line and the input terminal, which, in a case in which a comparison result from the comparator circuit is that the voltage of the input terminal is equal to or greater than a prescribed voltage, causes current to flow in one direction; a switching circuit for a closed loop, provided between a second line and the input terminal, having a switching element and a unidirectional element connected in parallel with the switching element, which causes current to flow in one direction; and a control circuit for controlling the switching element for the closed loop based on a frequency divided signal of an internal frequency division circuit, wherein a chopper voltage is generated from electrical power of the power source, the chopper voltage being generated between the first line and the second line. The method may comprise: deactivating the switching element into the off state compulsorily from a time at which the switching circuit for charging is switched on until a decision is made that charging has ended; resetting the internal frequency division circuit, so as to stop the clock signal frequency division operation when it is decided that charging has ended; and activating the switching element into the on state for a predetermined time period when it is decided that charging has ended.

The aforementioned power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

In accordance with a further aspect of the present invention; there is provided a method for controlling a chopper circuit including a first comparator circuit comparing a voltage of a first line with a voltage of one input terminal to which electrical power of an alternating current power source is supplied; a first switching circuit, provided between the first line and the one input terminal, which, in a case in which the voltage of the one input terminal is equal to or greater than a prescribed voltage, causes current to flow in one direction; a second comparator circuit comparing a voltage of the first line with a voltage of another input terminal to which electrical power of an alternating current power source is supplied; a second switching circuit, provided between the first line and the another input terminal, which, in a case in which the voltage of the another input terminal is equal to or greater than a prescribed voltage, causes current to flow in one direction; a third switching circuit, provided between the second line and the one input terminal, having a switching element and a unidirectional element connected in parallel with the switching element, which causes current to flow in one direction; a fourth switching circuit, provided between the second line and the another input terminal, having a switching element and a unidirectional element connected in parallel with the switching element, which causes current to flow in one direction; and a control circuit controlling the switching elements of the third and fourth switching circuits, wherein a chopper voltage is generated from electromotive force of the alternating current power source, the chopper voltage being generated between the first line and the second line. The method may comprise: deciding, based on comparison results of the first and the second comparator circuits, whether or not the first and the second switching circuits have been off for a given amount of time; and activating the switching elements of the third and the fourth switching circuits into the on state for a predetermined time period when the decision is affirmative.

The aforementioned alternating current power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

In accordance with still another of the present invention; there is provided a method for controlling a chopper circuit including a first comparator circuit comparing a voltage of a first line with a voltage of one input terminal to which electrical power of an alternating current power source is supplied; a first switching circuit provided between the first line and the one input terminal, which, in a case in which the voltage of the one input terminal is equal to or greater than a prescribed voltage, causes current to flow in one direction; a second comparator circuit comparing a voltage of the first line with a voltage of another input terminal to which electrical power of an alternating current power source is supplied; a second switching circuit, provided between the first line and the another input terminal, which, in a case in which the voltage of the another input terminal is equal to or greater than a prescribed voltage, causes current to flow in one direction; a third switching circuit, provided between the second line and the one input terminal, having a switching element and a unidirectional element connected in parallel with the switching element, which causes current to flow in one direction; a fourth switching circuit, provided between the second line and the another input terminal, having a switching element and a unidirectional element connected in parallel with the switching element, which causes current to flow in one direction; and a control circuit controlling the switching elements of the third and fourth switching circuits based on a frequency divided signal of an internal frequency division circuit, wherein a chopper voltage is generated from electromotive force of the alternating current power source, the chopper voltage being generated between the first line and the second line. The method may comprise: deactivating the switching element into the off state compulsorily from a time at which the switching elements of the first and second switching circuits are switched on until a decision is made that charging has ended; resetting the internal frequency division circuit, so as to stop the clock signal frequency division operation when it is decided that charging has ended; and activating the switching elements in the third and fourth switching circuits into the on state for a predetermined time period when it is decided that charging has ended.

The aforementioned alternating current power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

In accordance with another aspect of the present invention, a chopper-type charging circuit may include either of the aforementioned chopper circuits, and a storage section that stores electricity of the chopper voltage of the chopper circuit.

In accordance with another aspect of the present invention, an electronic device may internally incorporate the above-mentioned chopper-type charging circuit, which operates by electrical power supplied from the chopper-type charging circuit.

In accordance with yet another aspect of the present invention, a timekeeping apparatus may have the aforementioned chopper-type charging circuit, wherein time is kept by electrical power supplied from the chopper-type charging circuit.

BRIEF DESCRIPTION OF THE DRAWINGS

The above and other features of the present invention will be better understood by reading the description of exemplary embodiments that follows, in conjunction with the accompanying drawings, of which.

DETAILED DESCRIPTION OF THE PREFERRED EMBODIMENTS

A wristwatch to which a chopper-type charging circuit is applied will be described below as an embodiment of the present invention.

Figure 1:
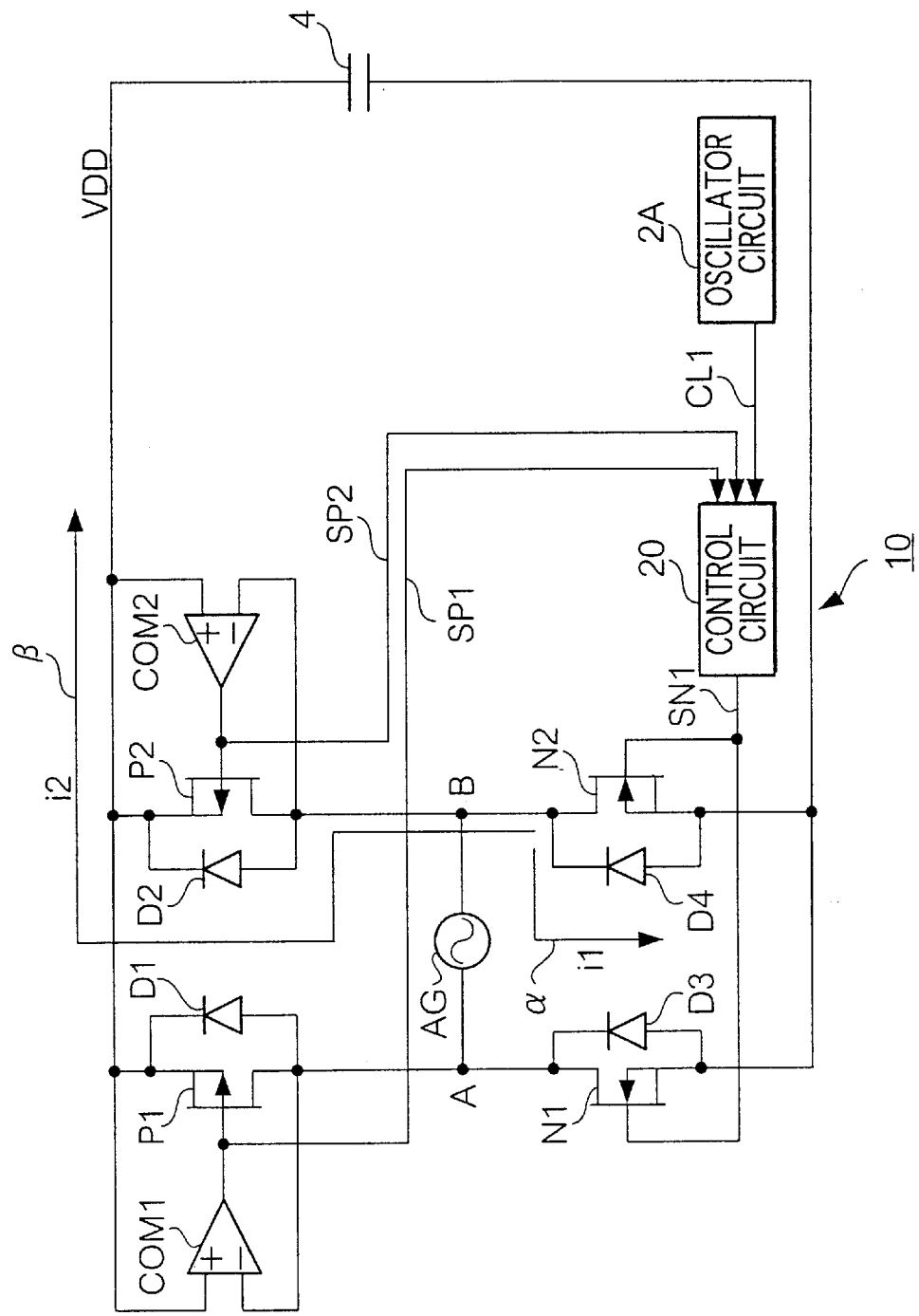
FIG. 1 is a circuit diagram of a chopper-type charging circuit used in a wristwatch according to the present invention.
Figure 25:
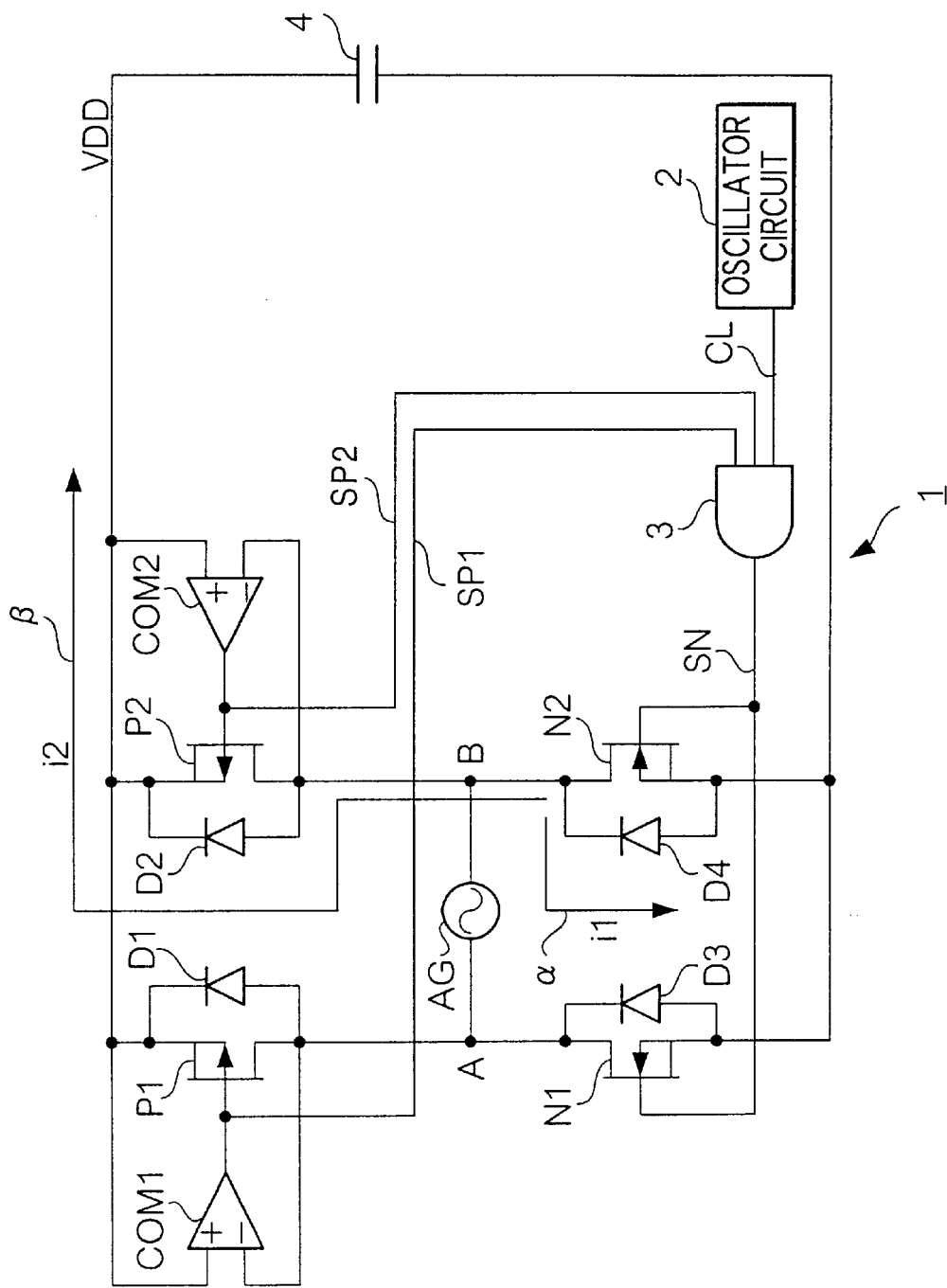
FIG. 25 is a circuit diagram of a chopper-type charging circuit of the past.

FIG. 1 is a circuit diagram of a chopper-type charging circuit used in a wristwatch according to the present invention. In this chopper-type charging circuit 10, aside from the fact that a control circuit 20 is used in place of the AND circuit 3 shown in FIG. 25, the configuration is almost the same as that the chopper-type charging circuit 1 of the past, and corresponding elements have been assigned the same reference numerals, and a detailed description of these elements will not be presented.

This chopper-type charging circuit 10 is formed by an oscillator circuit 2A, comparators COM1 and COM2, P-channel FETs P1 and P2 (switches for charging), N-channel FETs N1 and N2 (switches for a closed loop), a control circuit 20, and a large-capacitance capacitor 4 (storage element).

The oscillator circuit 2A outputs a clock signal CL. The comparator COM1 (COM2) performs a comparison of the voltages at output terminal A(B) of an alternating current electrical generator AG with a terminal voltage VDD. P-channel FET P1 is on/off controlled by the output signal SP1 of the comparator COM 1. P-channel FET P2 is on/off controlled by the output signal SP2 of the comparator COM2. By receiving the output signal SP1 of the comparator COM1 and the output signal SP2 of the comparator COM2, the control circuit 20 outputs signal SN1. Thus the N-channel FETs N1 and N2 are on/off controlled by the output signal SN1 that is outputted by a control circuit 20.

Although the diodes D1, D2, D3, and D4 (unidirectional elements) in this case are parasitic diodes of the P-channel FETs P1 and P2 and the N-channel FETs N1 and N2, it will be understood that they can alternately be normal diodes.

Additionally, the oscillator circuit 2A has the same configuration as the oscillator circuit 2 of the past, and in this case outputs a clock signal CL1 of 32 kHz.

Figure 2:
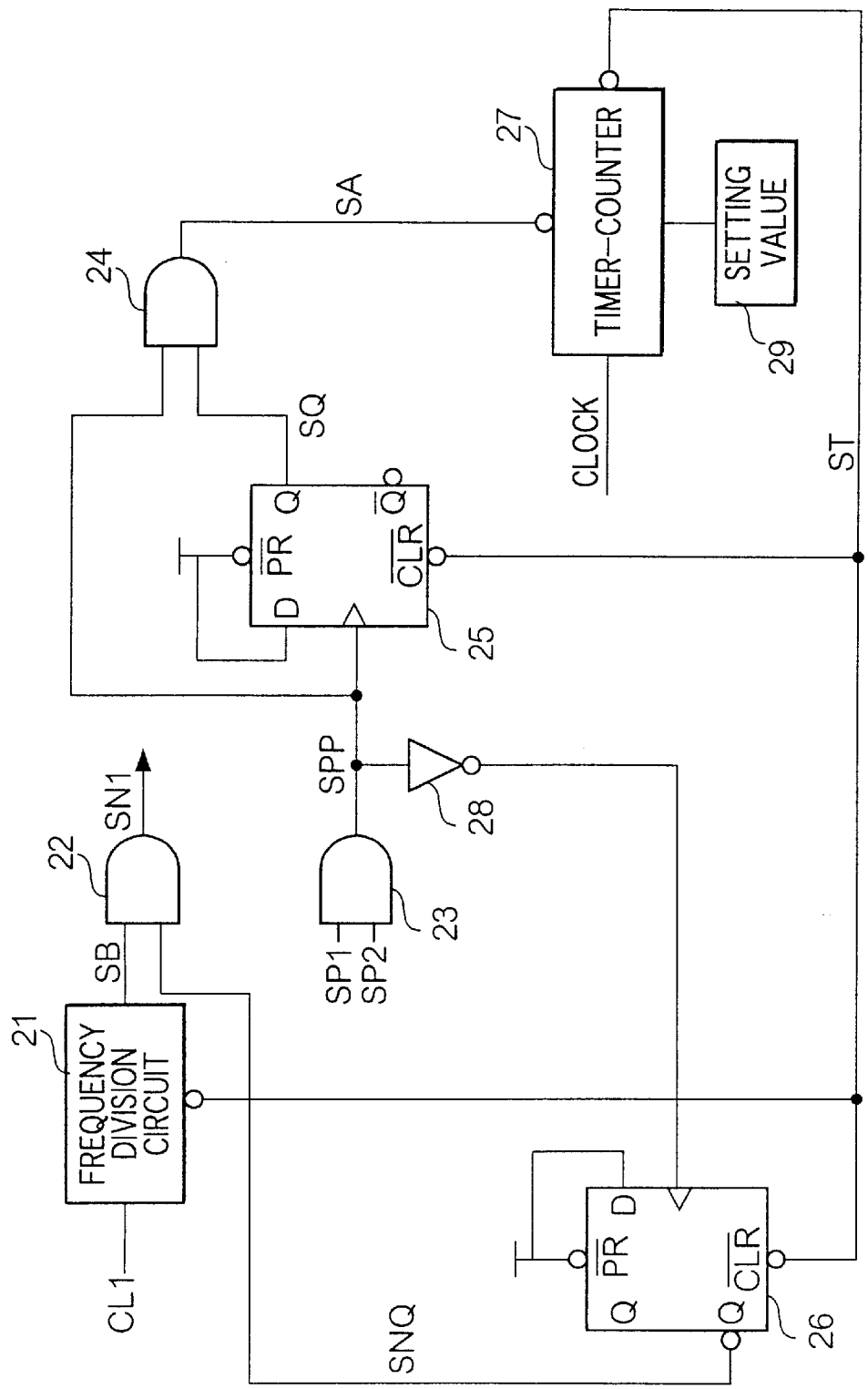
FIG. 2 is a circuit diagram of a control circuit of the chopper-type charging circuit of FIG. 1.

FIG. 2 is a circuit diagram of the control circuit 20.

The control circuit 20 is formed by a frequency division circuit (switching element controller) 21, three AND circuits 22, 23, and 24, two D-type flip-flop circuits 25 and 26, a timer-counter (charging end determination section) 27, and an inverter 28.

The frequency division circuit 21 frequency-divides the clock signal CL1, and supplies the frequency-divided signal SB to one of the input terminals of the AND circuit 22. The frequency division rate N of the frequency division circuit 21 is set as N=8, so that the frequency-divided signal SB has a frequency F that is ⅛ of the frequency of the clock signal CL1. The frequency-dividing operation of the division circuit 21 is reset by a signal ST, described later, that is supplied to a reset terminal.

The AND circuit 22 calculates the logical product (AND) of the frequency-divided signal SB and an on-inhibit signal SNQ to be described later, and the output signal SN1 thereof is supplied to the gates of the N-channel FETs N1 and N2.

The AND circuit 23 calculates the logical product of the output signal SP1 of the comparator COM1 and the output signal SP2 of the comparator COM2. Thus the output signal SPP thereof is supplied to the clock input terminal of the D-type flip-flip circuit 25, one input terminal of the AND circuit 24, and via the inverter 28, to a clock input terminal of the D-type flip-flop circuit 26.

The D-type flip-flop circuit 25 (charging end determination section) captures a high-level signal supplied to a D input terminal thereof when the signal SPP rises, the Q output terminal thereby changing to the high level. The D-type flip-flop circuit 25 is cleared when the signal ST supplied to the clear terminal CLR thereof changes to the low level. The signal at the Q output terminal of the D-type flip-flop circuit 25 is supplied as the signal SQ to the other input terminal of the AND circuit 24.

The signal SQ in this case functions as a signal that opens and closes the AND circuit 24. For this reason, when the SQ signal is at the high level, the signal SPP, which is supplied to the other input terminal of the AND circuit 24, is supplied, via the AND circuit 24, to the set/clear terminal of the timer-counter 27.

If the signal SPP changes to the high level, because both the signal SP1 and the signal SP2 are at the high level, both of the P-channel FETs P1 and P2 are in the off state. For this reason, the change of both the P-channel FETs P1 and P2 to the off state causes the signal SQ output from the D-type flip-flop circuit 25 to change to the high level, this being supplied, via the AND circuit 24, to the set/reset terminal of the timer-counter 27.

The timer-counter circuit 27 counts the clock signal supplied to the input terminal thereof when the signal SA supplied to the set/reset terminal thereof is at the high level, and resets its count value when the signal SA changes to the low level. When the count value of the timer-counter circuit 27 reaches a set value stored in a register 29, the carry signal ST of the output terminal thereof falls to the low level, and the count value is reset. It will be understood that the clock signal CL1 can also be used as the clock signal, and that a clock of a different frequency can be used.

That is, the timer-counter 27 counts the period of time during which the signal SA is at the high level, and when the signal SA is held at the high level for a given period of time, the carry signal ST is lowered to the low level for a short amount of time.

The carry signal ST is supplied to the CLR terminals of the D-type flip-flop circuits 25 and 26, and to the reset terminal of the frequency division circuit 21. For this reason, when the carry signal ST changes to the low level, the D-type flip-flop circuits 25 and 26 are clear, and the frequency division operation of the frequency division circuit 21 is reset.

The D-type flip-flop circuit 26 (time setting section and closed loop inhibit section) has supplied to the clock input thereof, via the inverter 28, the signal SPP, and when the signal SPP falls the high-level signal supplied to the D input terminal is captured, the inverted Q output terminal thereby changing to the low level. As described above, the D-type flip-flop circuit 26 is cleared when the carry signal ST supplied to the clear terminal CLR thereof changes to the low level.

The signal at the inverted Q output terminal of the D-type flip-flop circuit 26 is supplied as an on-inhibit signal SNQ to the other input terminal of the AND circuit 22.

The above-noted on-inhibit signal SNQ functions as a signal that turns the AND circuit 22 on and off. For this reason, when the on-inhibit signal SNQ is at the high level, the frequency-divided signal SB output from the frequency division circuit 21 is supplied to the gates of the N-channel FETs N1 and N2, via the AND circuit 22, as a signal SN1.

The configuration of the alternating current generator AG and the peripheral mechanism is as follows.

Figure 3:
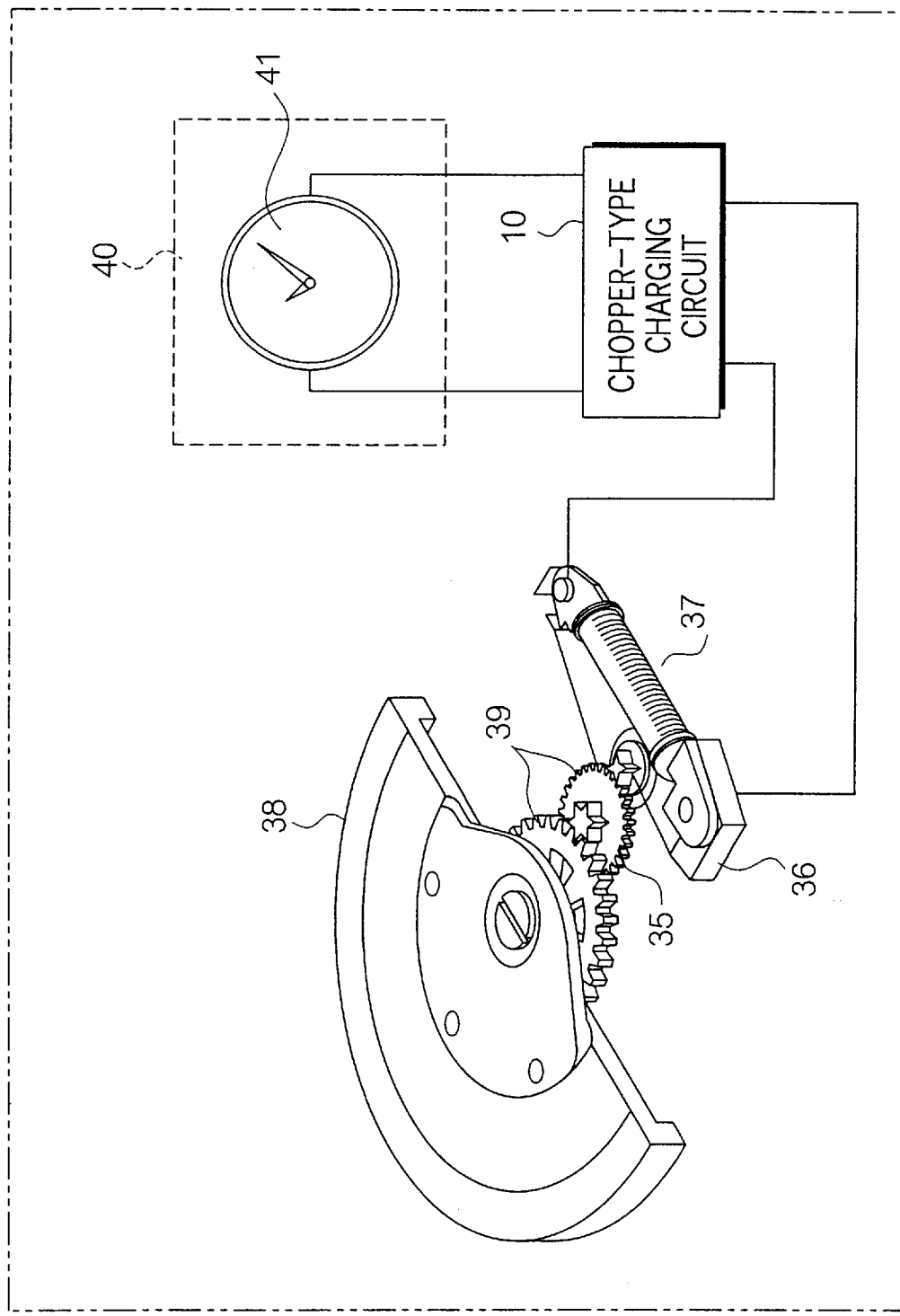
FIG. 3 is a perspective view showing the configuration of an alternating current and the peripheral mechanism of the wristwatch of FIG. 1.

FIG. 3 is a perspective view showing the configuration of the alternating current generator AG and the surrounding mechanism. As shown in this drawing, the alternating current generator AG has a rotor 35 and a stator 36 and, when the two-pole disc-shaped rotor 35 rotates, an electromotive force is generated in the generator coil 37 of the stator 36, so that an alternating current can be extracted therefrom as an output. In FIG. 3, the reference numeral 38 denotes a rotating flywheel, and 39 is a gear train mechanism that transmits rotational movement of the rotor 38 to the alternating current generator AG. The flywheel 38 rotates in response swinging of the arm of the wearer of the wristwatch, so that an electromotive force is obtained from the alternating current generator AG.

The term alternating current generator AG as used herein refers to a device that generates electricity by the rotation of a rotor by manual rotation of a stem, and an alternating current that generates electricity by rotation of a rotor by the winding and release of a coil spring.

The alternating current output from the alternating current generator AG is rectified by the chopper-type charging circuit 10 of this embodiment, and supplied to the processing apparatus 40. The processing apparatus 40 drives the timekeeping apparatus 41 by means of the electrical power supplied from the chopper-type charging circuit 10. The timekeeping apparatus 41 performs timekeeping operation based on the clock signal CL1 output from the oscillator circuit 2A.

As described above, the oscillator circuit 2A that generates the clock signal CL1 is used by both the chopper-type charging circuit 10 and the timekeeping apparatus 41. As a result, in addition to simplifying the overall circuit configuration of the wristwatch, it is possible to reduce the overall current consumption of the wristwatch.

The operation of the embodiment described above is described below, with reference made to the operational flowchart of the chopper-type charging circuit 100 shown in FIG. 4 and FIG. 5, and the timing diagram of FIG. 6. In this case, a wristwatch having the chopper-type charging circuit 100 is worn on the wrist, and electromotive force is generated from the alternating current generator AG.

Figure 6:
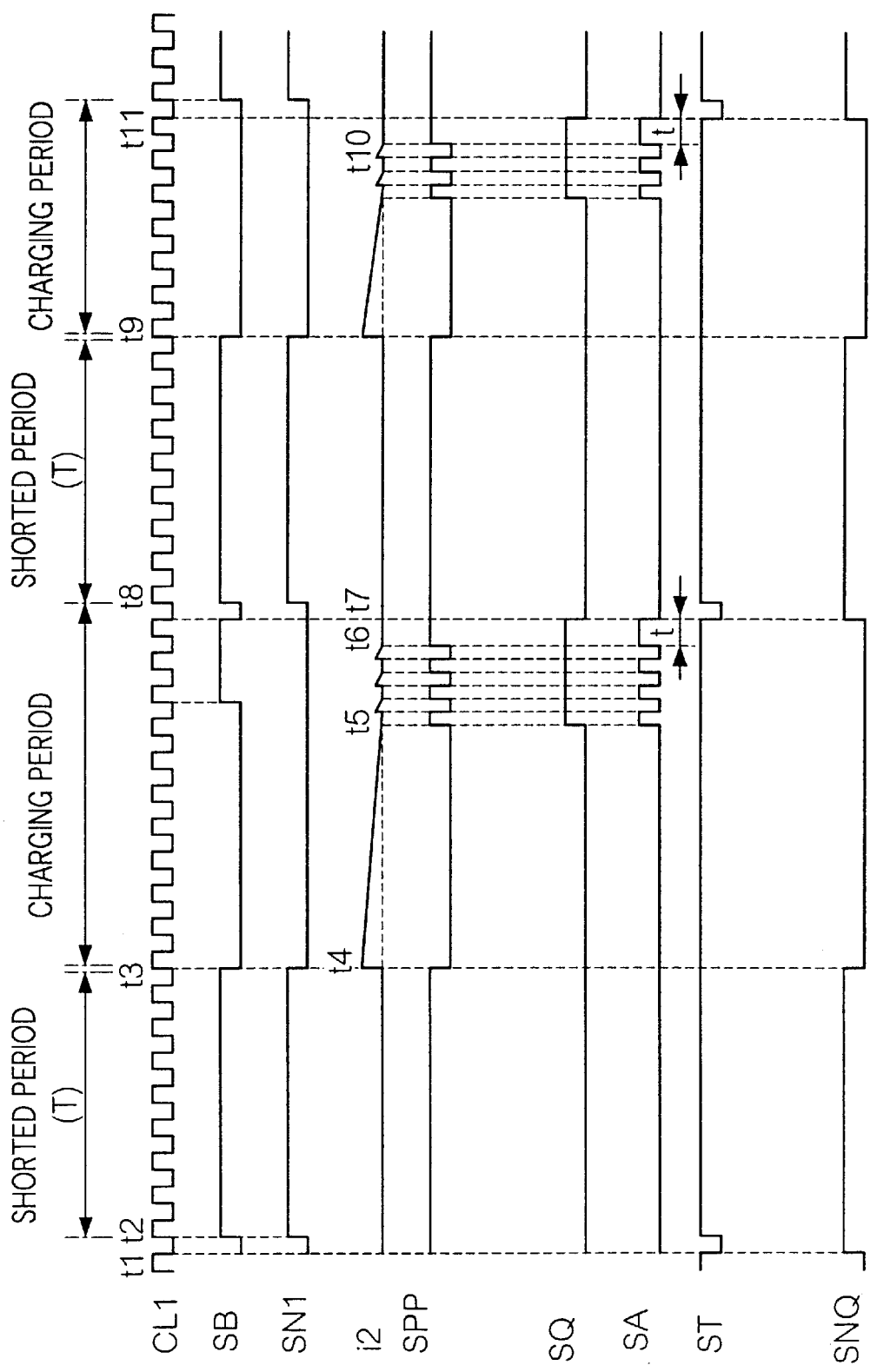
FIG. 6 is a timing diagram of the chopper-type charging circuit of FIG. 1.

FIG. 6 is a timing diagram of the chopper-type charging circuit 100 according to this embodiment. In this case, the assumption is that at the time t1, the output signal SP1 of the comparator COM1 and the output signal SP2 of the comparator COM2 are at the high level, the P-channel FETs P1 and P2 are in the off state, that is, the input terminals A and B of the alternating current AG are at voltages that are below the terminal voltage VDD.

Figure 4:
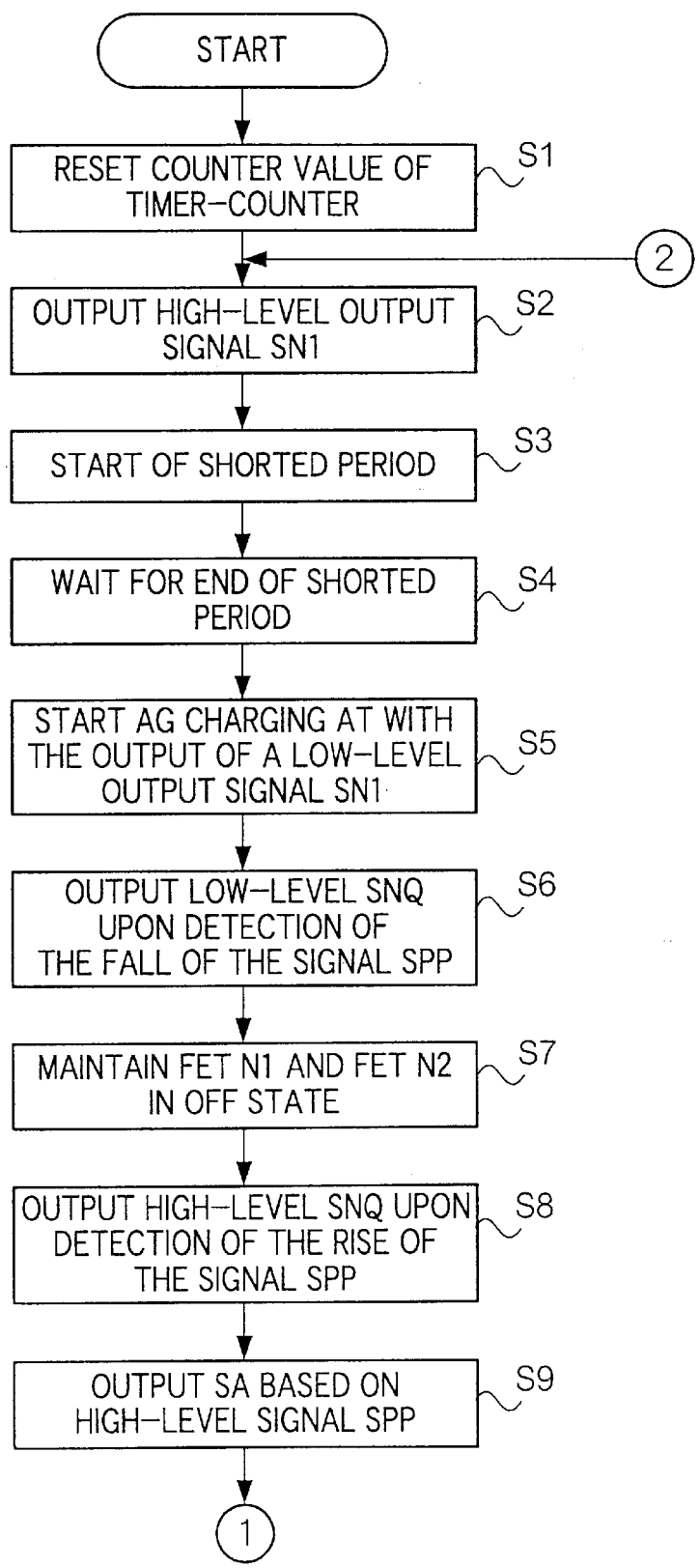
FIGS. 4 and 5 form a flowchart showing the operation of the chopper-type charging circuit of FIG. 1.

When the chopper-type charging circuit 100 starts operating, as shown in FIG. 6, when at time t1 the signal SA transitions from the high level to the low level, the count value of the timer-counter 27 is reset (step S1 in FIG. 4). The timer-counter 27 outputs a carry signal ST, which is at the low level for only a short time period, thereby clearing the D-type flip-flop circuits 25 and 26, and resetting the frequency division operation of the frequency division circuit 21.

By the above action, as shown in FIG. 6, the on-inhibit signal SNQ changes to the high level, and the AND circuit 22 is allowed to output the frequency-divided signal SB as the signal SN1.

As shown in FIG. 6, at the next fall of the clock signal CL1 at time t2, the frequency-divided signal SB changes to the high level. For this reason, the output signal SN1 of the control circuit 20 changes to the high level (step S2 in FIG. 4), and the N-channel FETs N1 and N2 are switched to the on state.

As a result of the above, as shown by the arrow α of FIG. 1, the closed loop formed by the alternating current generator AG and the N-channel FETs N1 and N2 forms a current path, and the shorted period begins (step S3 of FIG. 4). When this occurs, responsive to the electromotive force of the alternating current generator AG, a current i1 flows in the closed loop, and energy is stored in the inductance of the generator coil 37. The closed loop can also be formed by shorting the two terminals of the generator coil 37 or via a diode or a resistor or the like.

When the D-type flip-flop circuit 25 is cleared by the carry signal ST at time t1. As shown in FIG. 6, the signal SQ changes to the low level, resulting in the signal SA of the AND circuit 24 changing to the low level.

For this reason, the count value of the timer-counter 27 is maintained in the reset condition, and the carry signal ST is maintained at the high level.

Because the frequency-divided signal SB shown in FIG. 6 is a signal of frequency F, when a one-half period at the frequency (8 pulses of the clock signal CL1) elapses at time t3, it changes to the low level.

By the above change, the output signal SN1 of the control circuit 20 changes to the low level, and the N-channel FETs N1 and N2 are switched to the off state, so that the shorted period is ended (step S4 in FIG. 4).

By the energy stored in the inductance of the generator coil 37, the voltage at the output terminal A, for example, rises, and when at time t4 the voltage at the output terminal A reaches the terminal voltage VDD, the output signal SP1 of the comparator COM1 changes to the low level, and the P-channel FET P1 is set to the on state.

As a result of the above, a current path is formed to the large-capacitance capacitor 4 and, as shown by the arrow β in FIG. 1, a charging current i2 flows in the large-capacitance capacitor 4, thereby starting the charging (step S5 in FIG. 4).

At time t4, when the output signal SP1 of the comparator COM1 changes to the low level, as shown in FIG. 6, the output signal SPP of the AND circuit 23 changes to the low level, so that, the on-inhibit signal SNQ changes to the low level.

That is, if the voltage at the output terminal A rises to equal to or greater than the terminal voltage VDD and a current path to the large-capacitance capacitor 4 is formed, because it is possible to cause a charging current to flow in the large-capacitance capacitor 4, the on-inhibit signal SNQ changes to the low level (step S6 in FIG. 4).

By the above, when the charging condition is satisfied, the on-inhibit signal SNQ changes the output signal SN1 of the control circuit 20 to the low level, thereby maintaining the N-channel FETs N1 and N2 in the off state (step S7 in FIG. 4).

While the description is for the case in which the voltage a terminal A rises, because the operation of the comparator COM2 and the P-channel FET P2 would be the same in the case in which the voltage at the terminal B rises as the operation of the comparator COM1 and the P-channel FET P2 in the described case this will not be explicitly described.

When charging results in a gradual decrease in the voltage at the output terminal A, so that the voltage at the output terminal A falls below the terminal VDD at time t5, the output signal SP1 of the comparator COM1 changes to the high level, and the P-channel FET P1 is switched to the off state.

In the above case, because the signal SP1 and the signal SP2 are both at the high level, the output signal SPP from the AND circuit 23, as shown in FIG. 6, changes to the high level. For this reason, the D-type flip-flop circuit 25 detects the rise of the signal SPP and the signal SQ thereof changes to the high level (step S8 in FIG. 4), the signal SPP being supplied to the set/reset terminal of timer-counter 27 via the AND circuit 24. The result of this is that the timer-counter circuit 27 counts for just the period of time during which the signal SPP (which is the same as the signal SA) is at the high level (step S9 in FIG. 4).

Figure 5:
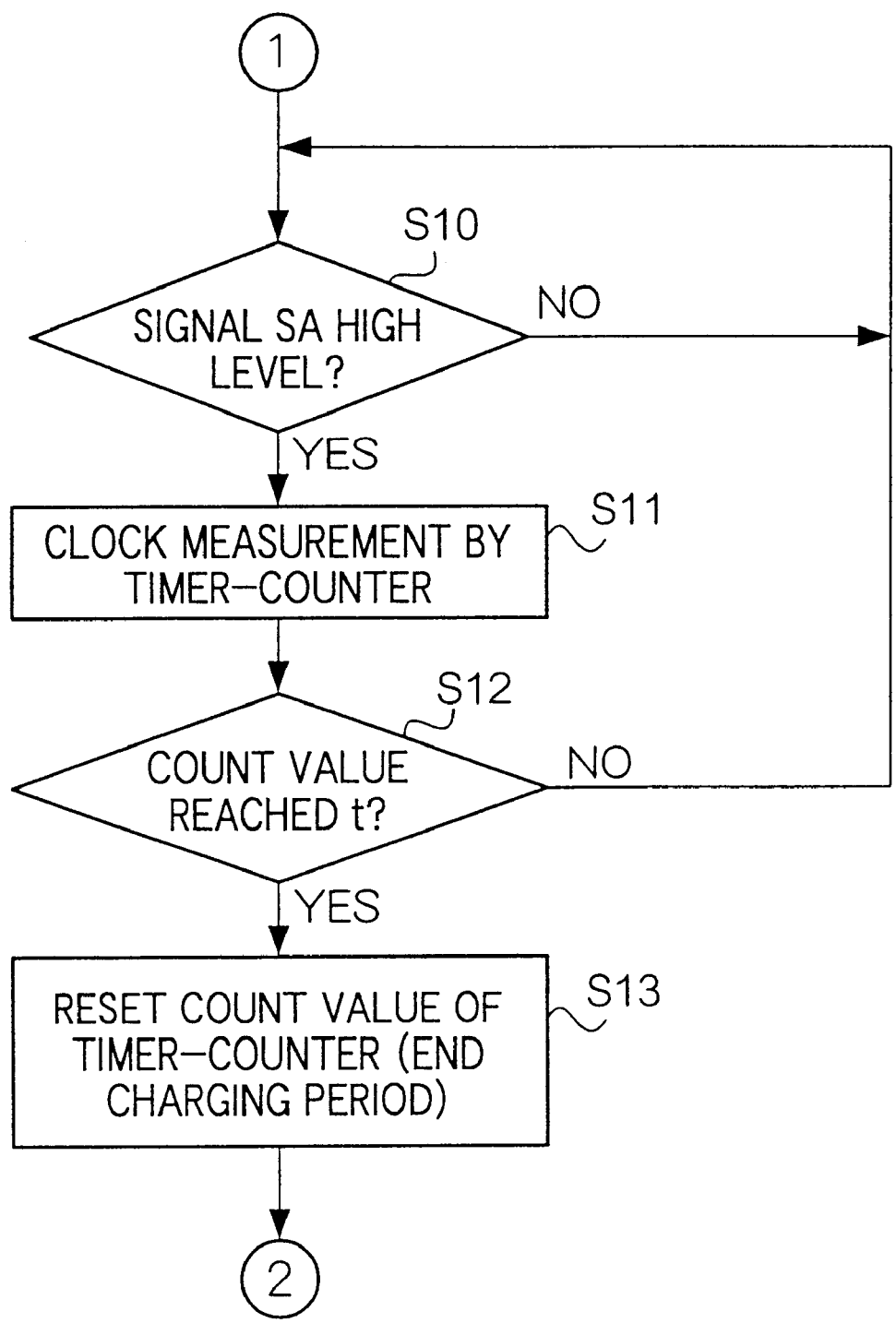

At the timer-counter circuit 27, a decision is made as to whether or not the signal SA is at the high level (step S10 in FIG. 5) and if it is at the high level the clock is measured (step S11 in FIG. 5), this measurement being repeated until a priorly established count value is reached (step S12 in FIG. 5). If the count value reaches t at step S12 (YES result at step S12), the decision is made that variation due to chattering has settled and that charging has been completed, and the count value of the timer-counter circuit 27 is reset to prepare for the next shorted period (step S13), processing being then repeated from step S2.

That is, when the P-channel FET P1 is switched to the off state during the charging period, the timer-counter circuit 27 starts to count the off-state period of both of the P-channel FETs P1 and P2.

Then, if the off state of the P-channel FETs P1 and P2 has continued for a given period of time, when at time t7 the count value reaches a set value held in the register 29, as shown in FIG. 6, the carry signal ST falls to the low level for a relatively short amount of time.

The difference time t between the time t6 and the time t7 corresponds to the set value held in the register 32. For this reason, by changing this set value it is possible to adjust the length of the time t.

By the above, when the D-type flip-flop circuit 26 is cleared by receiving the carry signal ST, as shown in FIG. 6, the on-inhibit signal SNQ changes to the high level at the time t7, and frequency-divided signal SB is supplied as the signal SN1, via the AND circuit 22, to the gates of the N-channel FETs N1 and N2.

Therefore, the on-inhibit signal SNQ is maintained at the high level until the both the P-channel FETs P1 and P2 off states are held for a given amount of time, thereby maintaining the N-channel FETs N1 and N2 in the off state.

Therefore, when the condition for charging is satisfied, the control circuit 20 switches the N-channel FETs N1 and N2 to the on state by means of the on-inhibit signal SNQ, and maintains the N-channel FETs N1 and N2 in the off state until the P-channel FETs P1 and P2 have been in the off state for a given amount of time.

In order to reduce the resistance in the charging path and improve the charging efficiency, P-channel FETs P1 and P2 are used which have a relatively low source-to-drain conduction resistance (on-state resistance).

For this reason, during the charging period when the voltage at the output terminal A approaches the terminal voltage VDD and the P-channel FET P1 switches from the on state to the off state, because of the forward voltage drop of the diode D1, the voltage across the two terminals of the comparator COM1 rises, so that the operation of the P-channel FET P1 switching again to the on state is repeated.

That is, the phenomenon wherein the P-channel FET P1 repeats the on and off operation at the end of the charging occurs (from time t5 to time t6 in FIG. 6).

Figure 26:
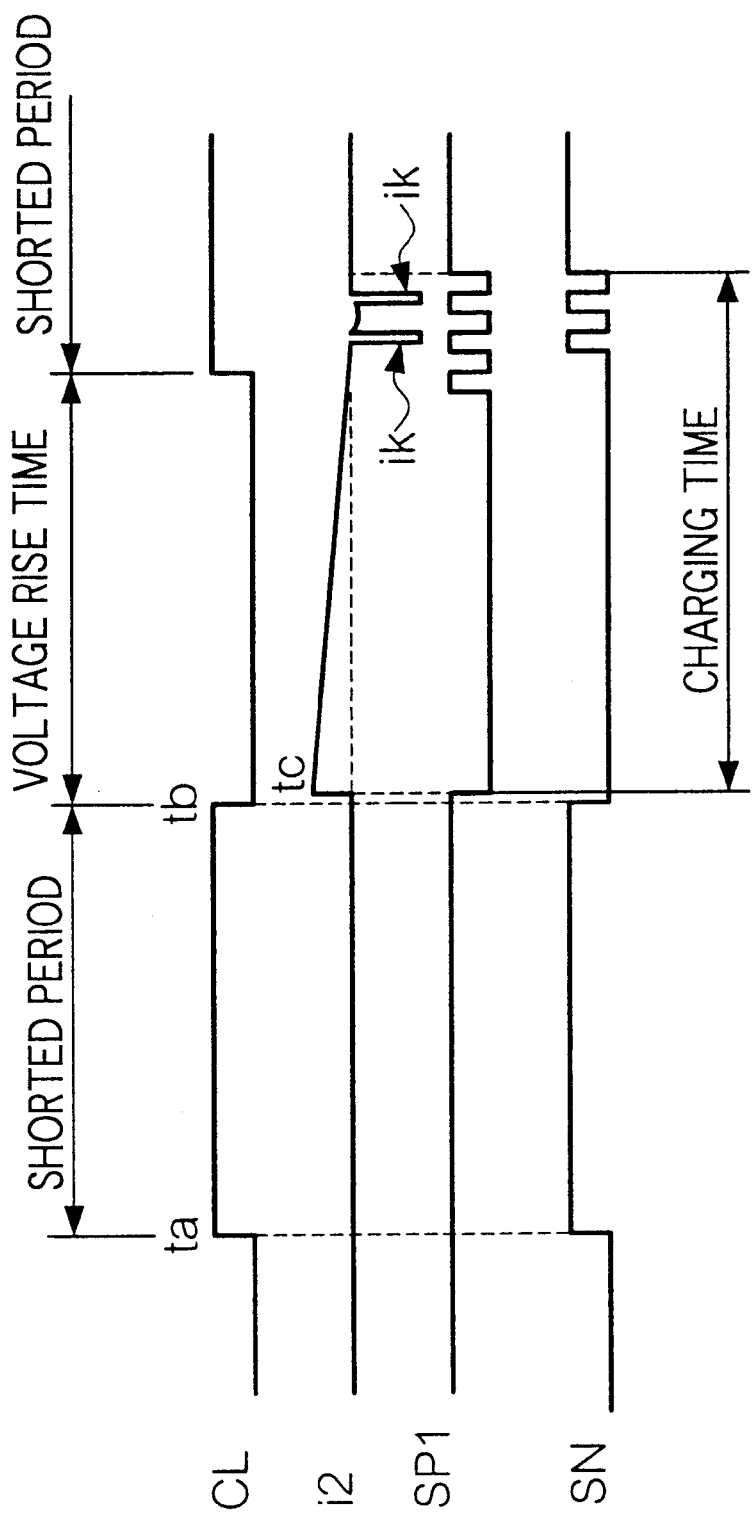
FIG. 26 is a timing diagram of the chopper-type charging circuit of the past.

In this case, if the N-channel FETs N1 and N2 switch to the on state, a period of time occurs during which both the P-channel FET P1 and the N-channel FETs N1 and N2 are in the on state, such as shown in FIG. 26, so that charging current (through current) ik flows from the large-capacitance capacitor 4, thereby lowering the charging efficiency.

In this embodiment of the present invention, as described above, the timer-counter 27 detects whether or not both of the P-channel FETs P1 and P2 are in the off state and, by means of the on-inhibit signal SNQ the N-channel FETs N1 and N2 are maintained in the off state until the P-channel FETs P1 and P2 remain in the off state for a given amount of time.

By doing this, in the chopper-type charging circuit 10, during the period of time over which chattering occurs in the P-channel FETs P1 and P2 (for example, from the time t5 to the time t6), it is possible to maintain the N-channel FETs N1 and N2 in the off state, thereby preventing a decrease in the charging efficiency due to through current. In this sense, the timer-counter 27 functions as a charging end determination section, and the D-type flip-flop circuit 26 functions as a closed loop inhibition section.

As described above, when the carry signal ST falls to the low level, the D-type flip-flop circuit 25 is cleared and the frequency division operation of the frequency division circuit 21 is reset, so that the frequency-divided signal SB changes to the high level at the rising edge of the clock signal CL1 after the resetting of the frequency division operation of the frequency division circuit 21, and the on-inhibit signal SNQ changes to the high level (time t8).

By the above, after both of the P-channel FETs P1 and P2 are in the off state for a given amount of time, the N-channel FETs N1 and N2 are switched to the on state, and transition is made to the shorted period. A closed loop is formed by the alternating current generator AG, and the N-channel FETs N1 and N2, energy being stored in the inductance of the generator coil 37 in response to electricity generated by the alternating current generator AG.

Because the frequency division operation of the frequency division circuit 21 is reset at the time t8, after reaching time t9 at which a half-period of time at the frequency F obtained by frequency division by the frequency division circuit 21, the frequency-divided signal SB changes to the low level (FIG. 6).

Therefore, because the N-channel FETs N1 and N2 are switched to the off state at the time t9, the shorted period ends, so that the energy stored in the inductance of the generator coil 37 during the shorted period causes the charging of the large-capacitance capacitor 4 to begin once again.

Next, as shown in FIG. 6, at time t10, when the P-channel FETs P1 and P2 have been in the off state for a given amount of time, at time t11, as shown in FIG. 6, the carry signal ST output from the timer-counter 27 is at the low level for just a short period of time.

By the above, similar to earlier described case, the D-type flip-flop circuits 25 and 26 are cleared, and the frequency division operation of the frequency division circuit 21 is reset, thereby making the on-inhibit signal SNQ and the frequency-divided signal SB high, as shown in FIG. 6, and making the signal SN1 high. The result of this is that the charging period ends.

As a result of the above, the N-channel FETs N1 and N2 are switched to the on state, causing a transition to the shorted period again, during which energy is stored in the generator coil 37, responsive to electricity generated by the alternating current generator AG.

Thus, because the shorted period in the chopper-type charging circuit 10 of the present invention is fixed as the half-period time at the frequency F obtained by the frequency division by the frequency division circuit 21, it is possible to achieve a constant shorted period.

Because the charging time is maintained as long as the P-channel FETs P1 and P2 remain in the on state, this varies in response to the energy stored in the generator coil 37, that is, in response to the amount of electricity generated by the alternating current generator AG. Therefore, the chopper frequency is automatically adjusted so that when the amount of electricity generated is small, the duty cycle of the shorted period is equal to or greater than in the case in which the amount of generated electricity is large.

The optimization of the shorted period and the chopper frequency of the above-noted chopper-type charging circuit 10 is done as follows.

First, in the chopper shorted period, the energy consumed in the internal resistance of the generator coil 37 of the alternating current generator AG and the energy stored in the inductance are determined, and the optimum shorted period is determined, after which a simulation is performed with regard to the voltage rise and the chopper open time.

Figure 7:
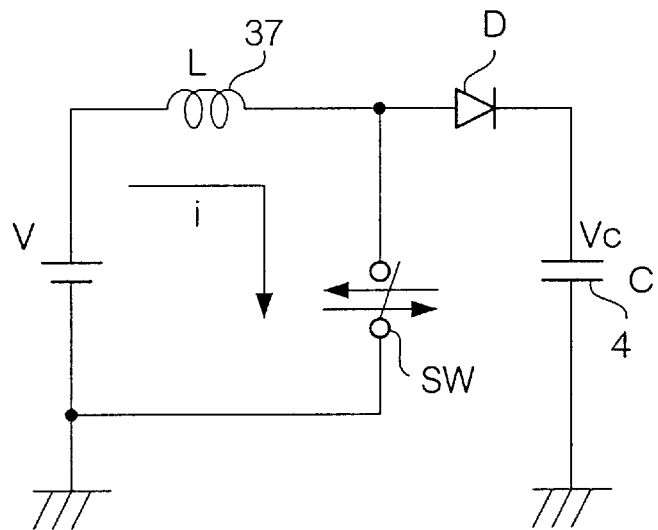
FIG. 7 is a circuit diagram illustrating the action of voltage rising due to inductance.

The shorted period is calculated as follows. As an aid to understanding the voltage rise operation in the inductance, assume a circuit such as shown in FIG. 7. In this case, if the generator coil 37 is taken as being an ideal inductance with no resistance component, the voltage V(t) and current I(t) of the generator coil 37 are as shown in the relationships below, in which L is the inductance of the generator coil 37.

$$V(t)=L \cdot di(t)/dt \qquad (1)$$

$$I(t)=\int (V(t)/L) \, dt \qquad (2)$$

That is, the current I(t) flowing in the generator coil 37 is proportional to the integrated value of the voltage V(t). If the switch SW is on and the current flowing through the generator coil 37 after the elapse of a prescribed amount of time thereafter is I, the energy UL stored in the generator coil 37 is $UL=\frac{1}{2} \cdot L \cdot I^2$. If the initial value of voltage of the large-capacitance capacitor 4 is given as Vc, the energy UC of the large-capacitance capacitor 4 is $UC=\frac{1}{2} \cdot C \cdot Vc^2$, in which relationship C is the capacitance of the large-capacitance capacitor 4.

If the switch SW is opened (placed in the off state), the current that had been flowing in the generator coil 37 flows in the large-capacitance capacitor 4, the energy UL that had been stored in the generator coil 37 being stored in the large-capacitance capacitor 4. When this occurs, the forward voltage of the diode D and the circuit loss are ignored, and if the voltage of the large-capacitance capacitor 4 rises to the voltage Vc1, the voltage Vc1 is expressed as follows.

From dUC=UL, $$\tfrac{1}{2} \cdot C \cdot (Vc1^2 - Vc^2) = \tfrac{1}{2} \cdot L \cdot I^2 \qquad (3)$$

Thus, solving Equation (3), we have $$Vc1 = I \cdot \sqrt{(L/C)} + Vc \qquad (4)$$

From Equation (4), the voltage Vc1 obtained by the raise in voltage is proportional to the current flowing in the generator coil 37. Because the current flowing in the generator coil 37 is proportional to the integrated value of the voltage of the generator coil 37, if this voltage is made constante, the time that the switch SW is turned on, that is, the shorted period establishes the voltage of the generator coil 37. With regard to the calculation of the voltage, for example, obtained by the voltage rise, part of the languague on p. 18–19 of Hasegawa, Akira *Switching Regulator Design Knowhow, Revised Edition* (CQ Shuppan) will be cited.

Because the generator coil 37 of this embodiment is a generator coil of a small alternating current generator AG, the internal resistance is large, making it unavoidable to ignore. Therefore, the chopper-type charging circuit 10 of this embodiment can be represented as shown in FIG. 8.

Figure 8:
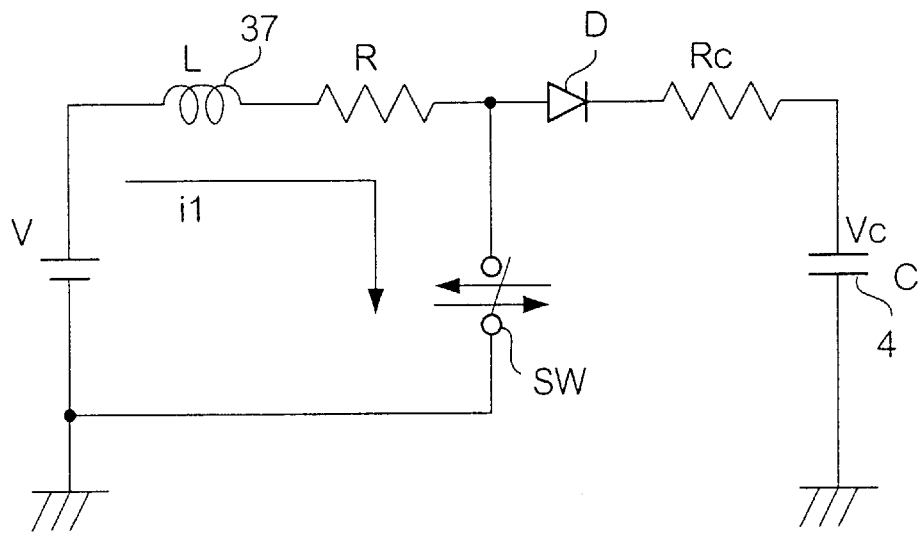
FIG. 8 is a circuit diagram illustrating the action of voltage rising due to inductance, when the internal resistance is considered.

In FIG. 8, R represents the internal resistance of the generator coil 37, and Rc is the internal resistance of the large-capacitance capacitor 4.

In this case, if the switch SW is set to on and the current flowing in the generator coil 37 is i1(t), the voltage V1(t) on the generator coil 37 is expressed as follows.

$$V1(t)=L \cdot di(t)/dt+R1 \cdot i1(t) \qquad (5)$$

From Equation (5), the current i1(t) flowing in the generator coil 37 is as follows.

$$i1(t)=V1(t)/R \cdot (1-e^{-R \cdot t/L}) \qquad (6)$$

By the above, from Equation (6), the current i1(t) flowing in the generator coil 37 is controlled by the voltage V1(t) of the generator coil 37 and the current value established by the internal resistance R.

Figure 9:
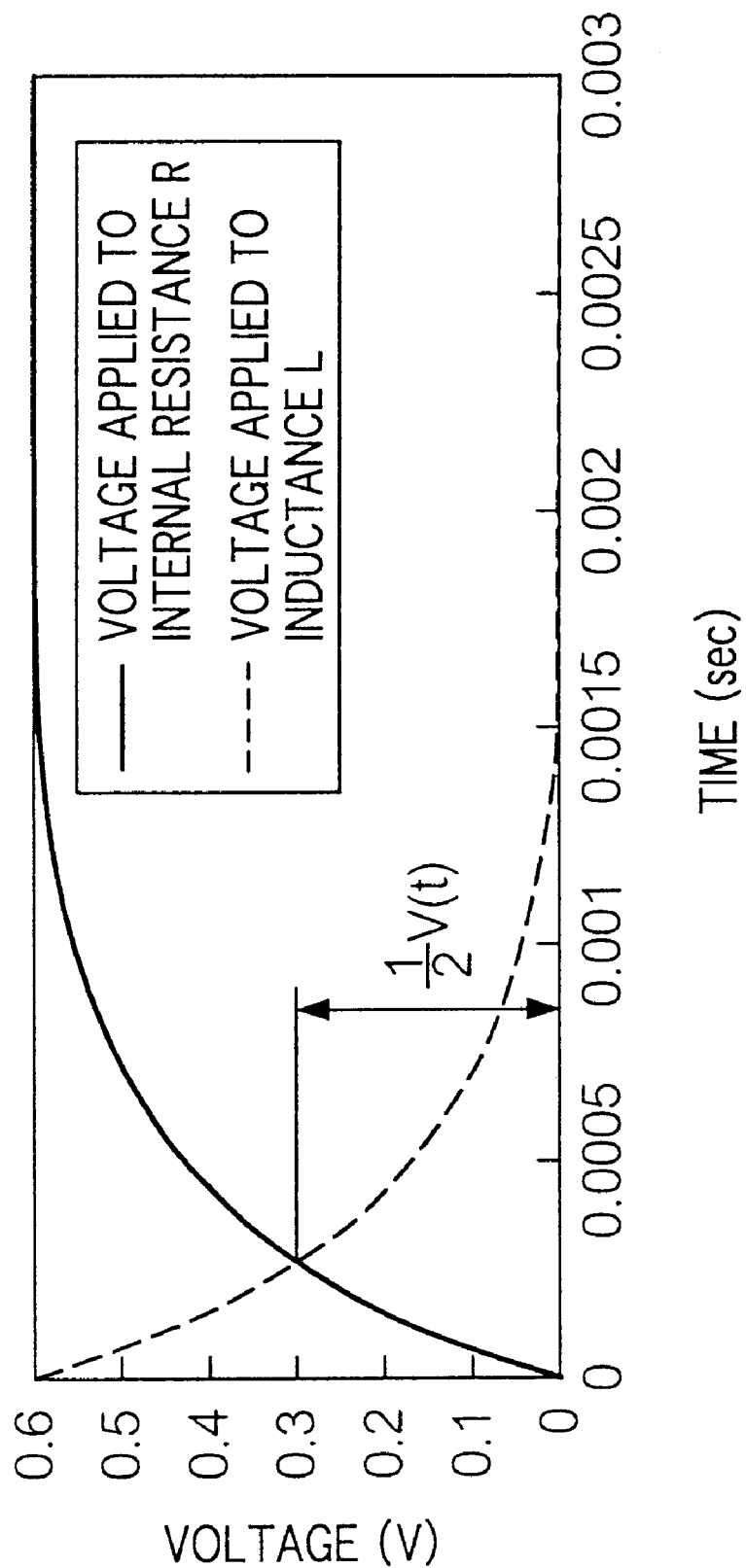
FIG. 9 is a characteristics graph showing the internal resistance of the generator coil and the time variation of the voltage applied to the inductance L during the chopper shorted period.

FIG. 9 is a characteristics graph showing the internal resistance of the generator coil and the time variation of the voltage applied to the inductance L during the chopper shorted period. In this case, it is assumed that the generator coil 37 has a time constant τ=(L/R)=approximately 0.4 ms, and that the electromotive force is 0.6 V.

As shown in FIG. 9, the voltage V1(t) applied to the inductance L exponentially decreases and, at equal to or greater than approximately 2 ms, all of the 0.6-V electromotive force is applied to the internal resistance R, and consumed as copper loss. Therefore, if the shorted period is equal to or greater than approximately 2 ms, even after transitioning to the chopper open period, not only is it not possible to achieve efficient elevated-voltage charging, but also a force acts in the direction that stops the rotation of the rotor 35, thereby causing a decrease in charging efficiency.

Figure 10:
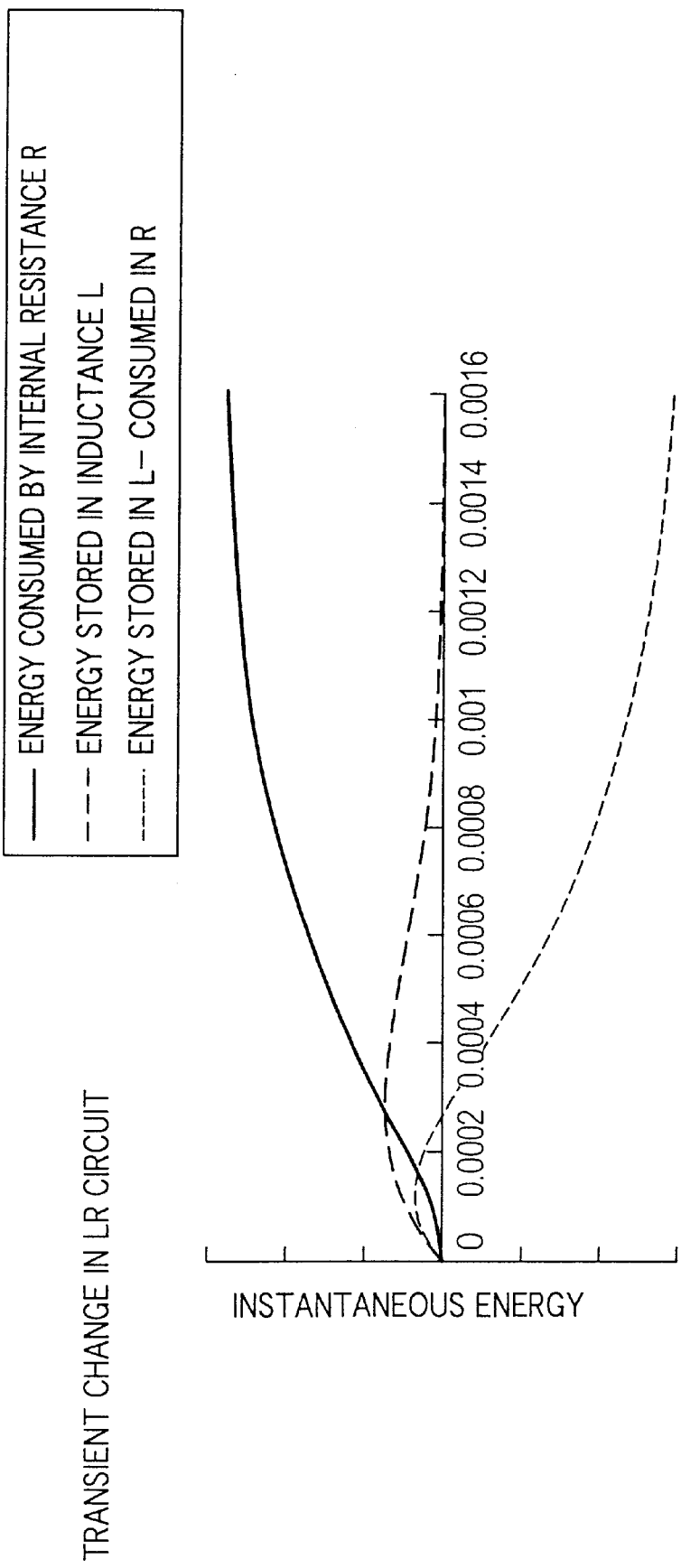
FIG. 10 is a characteristics graph showing the internal resistance of the generator coil and the time variation of the instantaneous energy of the inductance L during the chopper shorted period.

FIG. 10 is a characteristics graph showing, based on Equation (6), the internal resistance of the generator coil and the time variation of the instantaneous energy of the inductance L taken every 10 μsec. In FIG. 10, the difference of this instantaneous energy of the inductance L and the internal resistance R is shown by a dotted line.

Figure 11:
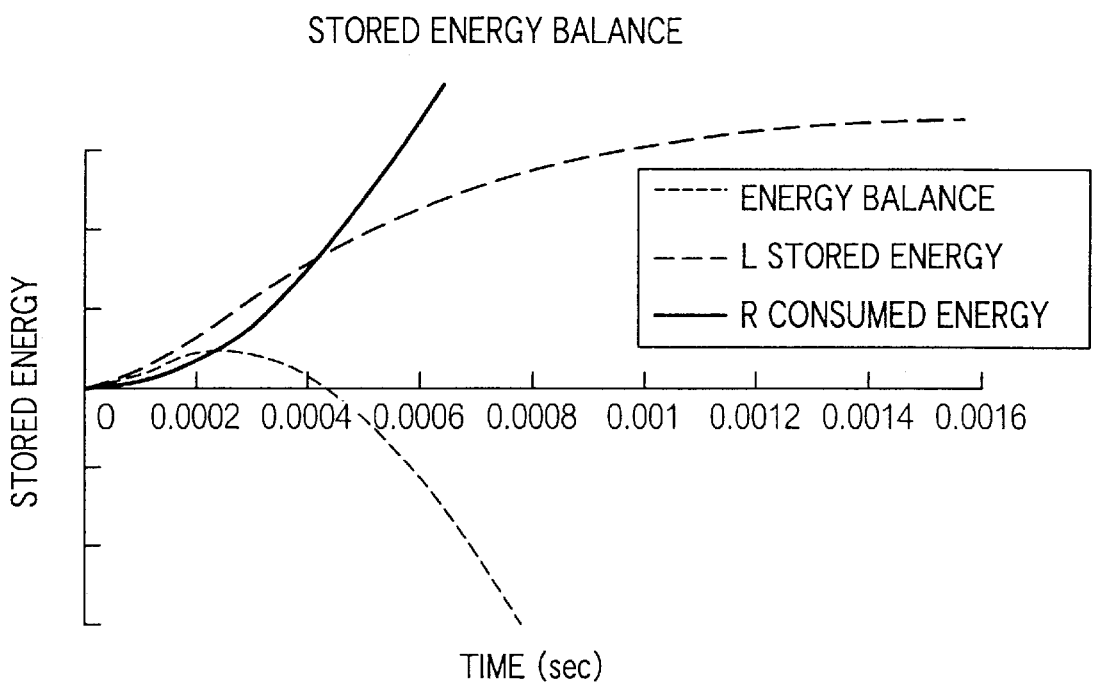
FIG. 11 is a characteristics graph showing the results shown in FIG. 10 converted to the accumulated energy value.

FIG. 11 is a characteristics graph showing the results shown in FIG. 10 converted to the accumulated energy value. As shown by FIG. 11, the energy UL stored in the inductance L saturates after approximately 1.6 ms. The energy UR consumed in the internal resistance R (shown by the solid line in FIG. 11) increases in an accelerated manner and, after 0.45 ms, becomes equal to or greater than the energy stored in the generator coil 37, so that the energy balance (UL-UR) becomes negative (indicated by the dotted line in FIG. 11).

Therefore, if the rectification loss of the diode D during charging and the loss in the internal resistance, for example, of the large-capacitance capacitor 4 are eliminated, in order to maximize the charging efficiency, it is sufficient to set the shorted period so as to obtain the maximum energy balance (UL-UR). That is, as shown in FIG. 11, in this case because the energy balance (UL-UR) is maximum at a time 0.27 ms after the switch SW is set to on, the charging efficiency is maximized if the shorted period is set to 0.27 ms.

If the shorted period is set to 0.27 ms as shown in FIG. 9, this corresponds to the time T at which the voltage across the internal resistance R and the voltage applied to the inductance L are equal.

Therefore, if R·i1(t)=½·V(t) is substituted into Equation (6), the shorted period can be expressed as shown in the following equation.

$$T = 0.693 \cdot L/R \quad (7)$$

From the above results, it is possible to establish the shorted period in response to the inductance and the internal resistance of the generator coil 37. In the above-described embodiment, if for example the time constant of the generator coil 37 is τ=approximately 0.4 ms, the shorted period is set to 0.27 ms. More specifically, in the frequency division circuit 21 what is done is that frequency division is done of the clock signal CL1 to achieve a frequency of 1.851 kHz, which has a half-period time equal to the shorted period. In this embodiment, because a 32-kHz clock signal is used as the clock signal CL1, the frequency F is approximately by the value 2 kHz.

It is desirable that the shorted period be set within a range of ±30% of the value T, and further preferable that the shorted period be set within a range of ±20% thereof.

Figure 12:
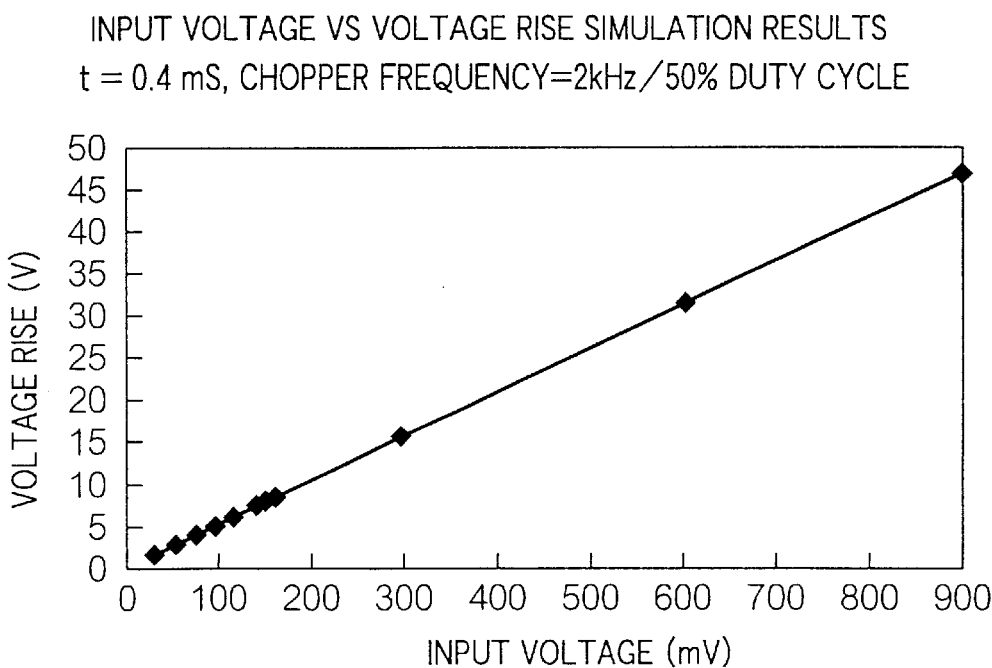
FIG. 12 is a characteristics graph showing the results of simulation of the voltage rise for the case of a chopping frequency of 2 kHz and a shorting period T of 0.25 ms.

Next, a simulation is performed with respect to the voltage rise, for the case in which the chopper frequency is 2 kHz, and the shorted period is set to 0.25 ms, the results of this simulation being shown in FIG. 12.

As shown in FIG. 12, if the input voltage, which is the electromotive force of the alternating current generator AG, is 150 mV or greater, it is possible store energy in the inductance L enabling a voltage rise up to approximately 6 V. In the actual charging, by connecting a secondary battery, because the charging voltage of the secondary battery is established by the internal resistance, for example, of the large-capacitance capacitor 4, although there is not a rise in the charging voltage of the secondary battery to this level, it can be said that there is sufficient instantaneous rise of a small electromotive force with respect to the secondary battery.

Next, a simulation of the charging amount with the shorted period set to 0.25 ms and the chopper frequency set varied was performed.

Figure 13:
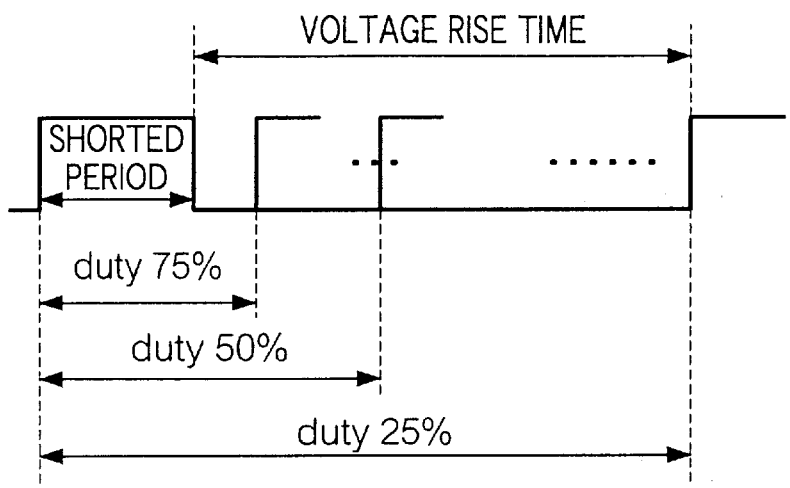
FIG. 13 is a drawing illustrating the shorting period duty cycle.
Figure 14:
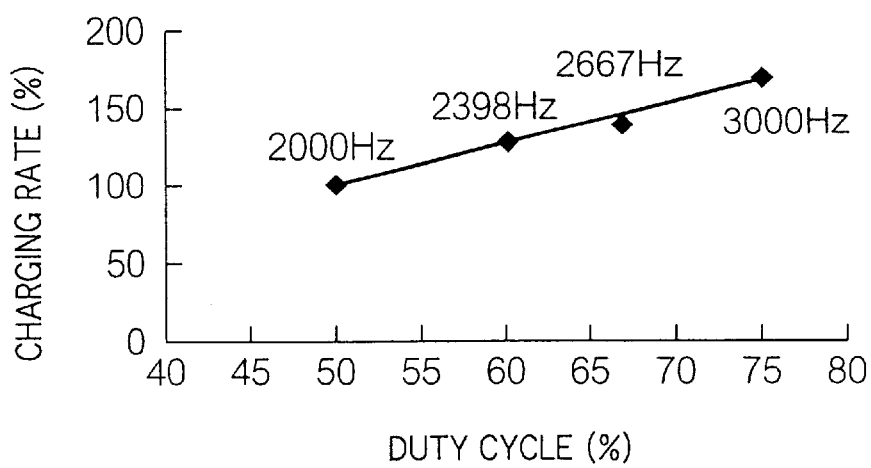
FIG. 14 is a characteristics graph showing a simulation of shorting period duty cycle and the charging charge amount for the case of a low input voltage.
Figure 15:
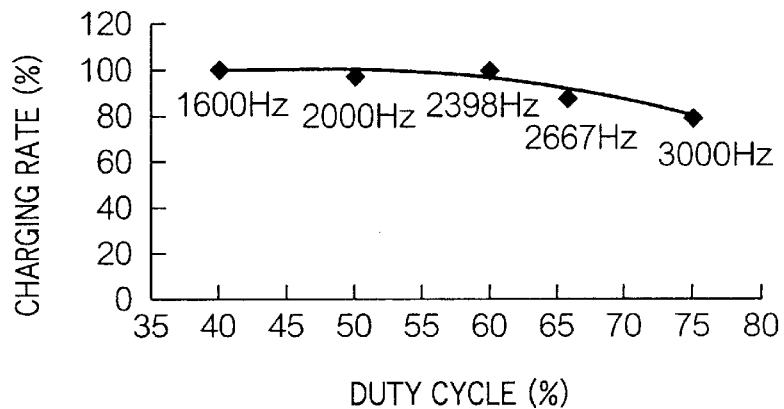
FIG. 15 is a characteristics graph showing a simulation of shorting period duty cycle and the charging charge amount for the case of a high input voltage.

As shown in FIG. 13, a simulation is performed with duty cycles (duty cycles) of the shorted period of 50% and 75% and so on, to determine the amount of charging charge, the results of this simulation being shown in FIG. 14 and FIG. 15. In FIG. 14 and FIG. 15, the chopper frequency that is established by the shorted period and the duty cycle is also indicated.

FIG. 14 shows the results of the simulation for the case of a low input voltage (0.15 V), and FIG. 15 shows the results of the simulation for the case of a high input voltage (0.9 V).

As is clear from FIG. 14, in the case of a low input voltage, if the chopper frequency is made high, that is, if the charging time is made short so as to achieve a larger number of voltage increases, the charging rate, which is expressed as the charging charge amount for each chopper frequency at 2 kHz multiplied by 100 tends to increase.

However, as shown in FIG. 15, when the input voltage is high, if the chopper frequency is made high, it becomes impossible to achieve a sufficient energy UL stored in the inductance L, and there is a tendency for the charging efficiency to decrease.

From the above-noted results, it can be seen that, it is possible to achieve a high charging efficiency by making the chopper frequency high in the case in which the input voltage is low, and by making the chopper frequency low in the case in which the input voltage is high.

Next, an experiment was performed to measure the charging rate in an actual chopper-type charging circuit by varying the chopper frequency and the shorted period.

Figure 16:
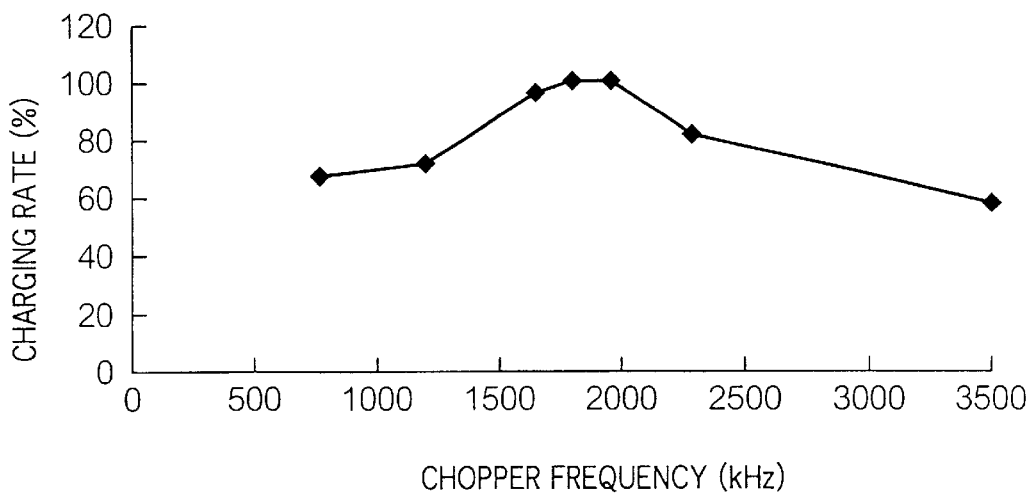
FIG. 16 is a characteristics graph showing experimental results of the chopping frequency and the charging charge amount for the case of a low input voltage.
Figure 17:
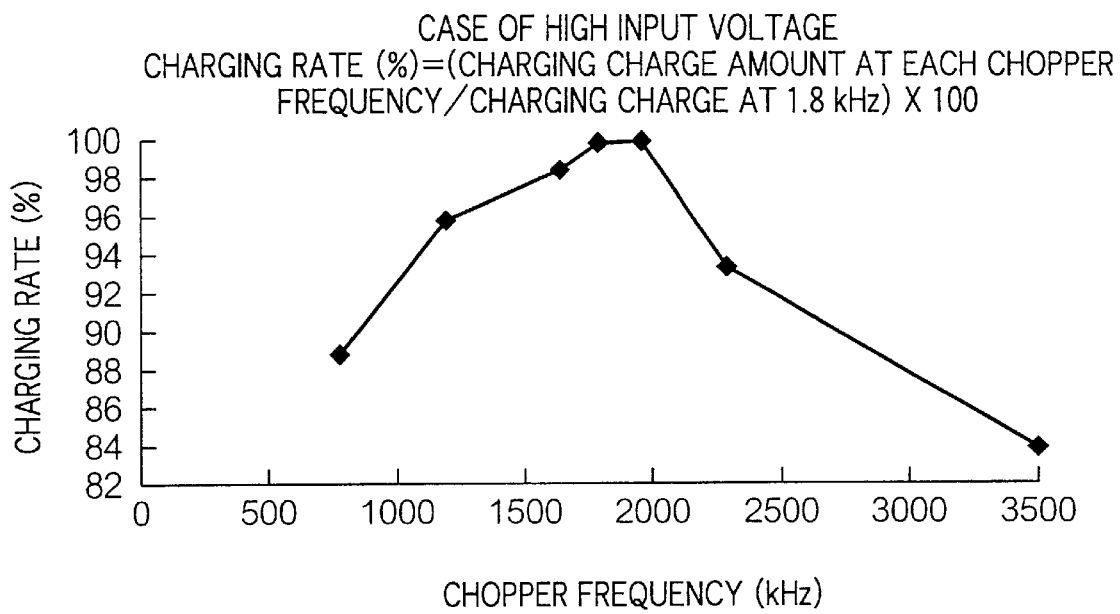
FIG. 17 is a characteristics graph showing experimental results of the chopping frequency and the charging charge amount for the case of a high input voltage.

An investigation was performed of the chopper frequency. FIG. 16 and FIG. 17 shows the results of the charging efficiency experiment wherein the chopper frequency was varied. In this experiment, the shorted period duty cycle was held fixed at 50%.

From the results shown in FIG. 16 and FIG. 17, it is seen that the charging efficiency is at a maximum value when the chopper frequency is in the region of 2 kHz.

Figure 18:
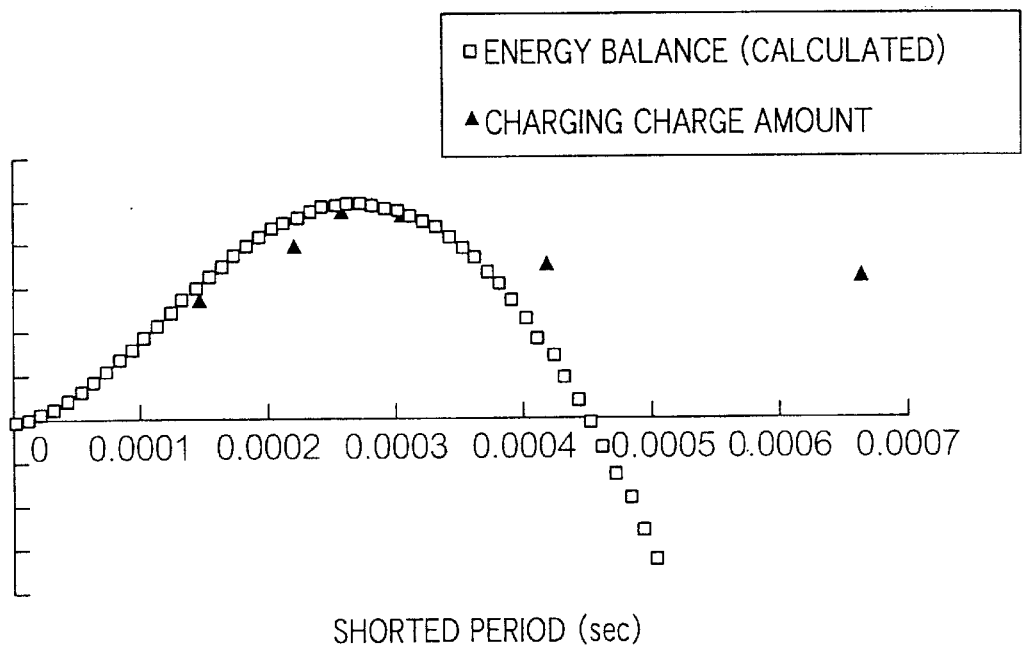
FIG. 18 is a characteristics graph showing experimental results of the shorting period and the charging charge amount by normalization of the results shown in FIG. 16 and results shown in FIG. 11.

FIG. 18 shows the result of normalizing the results shown in FIG. 16 and the results shown in FIG. 11 to the relationship between the shorted period and the charging charge amount. As shown in FIG. 18, in the experimental results as well, similar to the earlier calculated results, the charging efficiency is verified to be maximum at a shorted period of 0.27 ms.

Figure 19:
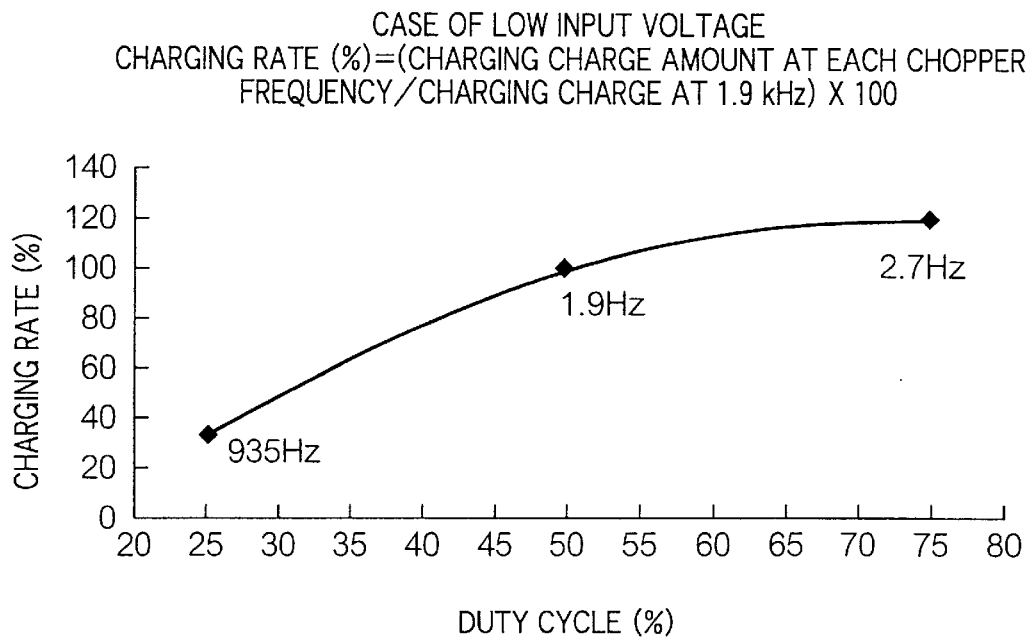
FIG. 19 is a characteristics graph showing experimental results of the shorting period duty cycle and the charging charge amount for the case of a low input voltage.
Figure 20:
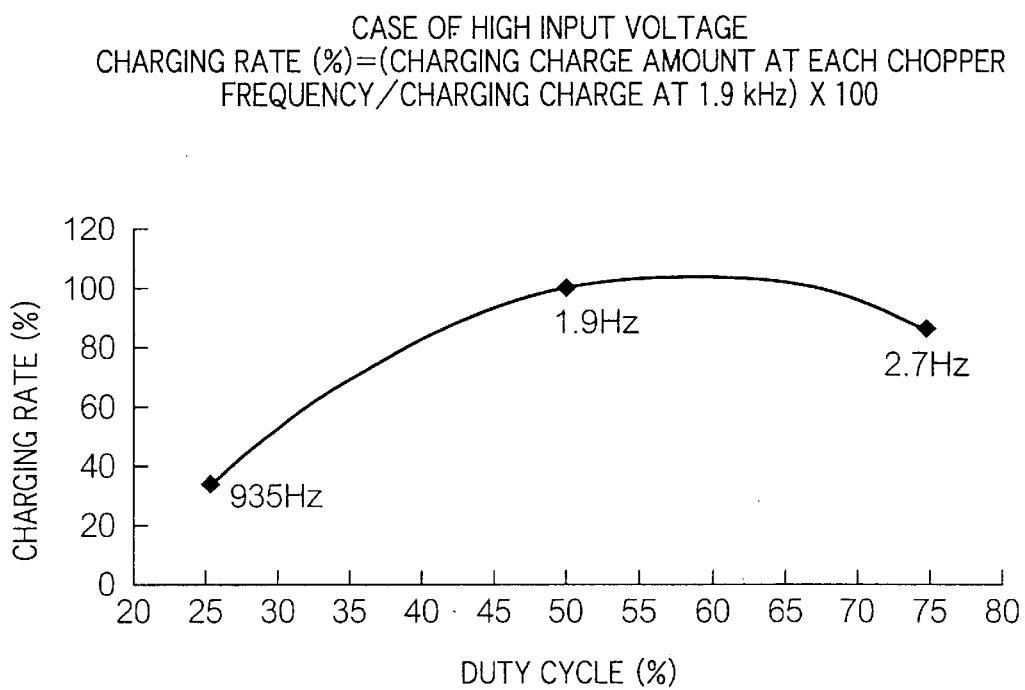
FIG. 20 is a characteristics graph showing experimental results of the shorting period duty cycle and the charging charge amount for the case of a high input voltage.

An investigation was done of the shorted period duty cycle. FIG. 19 and FIG. 20 show the results a charging rate experiment wherein the shorted period duty cycle was varied. In this experiment, the shorted period was held fixed at 0.27 ms.

In FIG. 19 the input voltage was a low value, and in FIG. 20 the input voltage was high.

In the experimental results shown in FIG. 19, if the input voltage is low, it is seen that making the shorted period duty cycle high increases the charging efficiency, and in the experimental results shown in FIG. 20, if the input voltage is high, it is seen that making the shorted period duty cycle high decrease the charging efficiency. These are the same results as obtained in the simulations shown in FIG. 14 and FIG. 15.

The reason that the charging rate is extremely low when the shorted period duty cycle is 25% in FIG. 20 is that at a high generated voltage the period of time of charging with non-chopped operation is more than half the time, the period of charging by chopper operation being only a part of the total period. This is because the amount of time of charging by chopper operation is close to the chopper period at a shorted period duty cycle of 25%.

Figure 21:
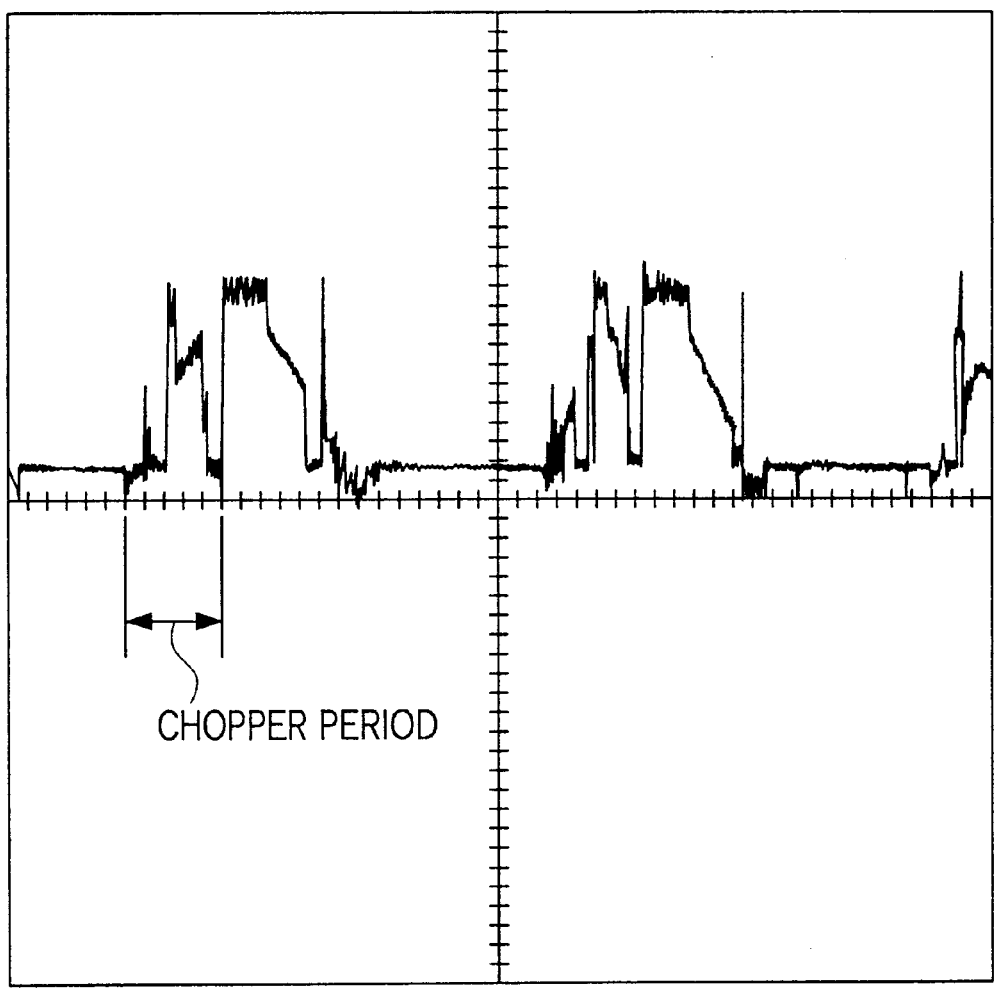
FIG. 21 is a waveform diagram showing the generated voltage waveform for the case of mixed chopper operation and non-chopped operation.

That is, as indicated by the generated voltage waveform resulting from the mixture of chopper operation and non-chopped operation charging as in FIG. 21, the chopper during chopper operation operates only about one or two times, so that there is almost no effect of the chopping.

From the above results, the lower the input voltage is, by making the shorted period duty cycle higher, it is possible to maintain a high charging efficiency. More specifically, if the shorted period T is made $0.693 \cdot L/R$, by making the shorted period duty cycle 60% or greater for a low input voltage or making the shorted period duty cycle 60% or less for a high input voltage, it is possible to maintain a high charging charge amount. It is more preferable that in the case of a low input voltage the shorted period duty cycle be made approximately 75%, and that for a high input voltage the shorted period duty cycle be made approximately 50%, thereby enabling the maximum charging charge amount.

From the above, it can be seen that, in the chopper-type charging circuit 10, even if there is variation in the amount of electricity generated by the alternating current generator AG, it is possible to operate with the optimum shorted period and chopper frequency, and to increase the charging efficiency.

Because in the chopper-type charging circuit 10 the charging period is established in accordance with the amount of electricity generated by the alternating current generator AG, the chopper frequency is automatically adjusted. For this reason, it is not necessary to detect the amount of electricity generated by providing a separate circuit or the like for detection of the charging current. It is therefore possible to increase the charging efficiency without increasing the overall circuit power consumption.

A number of variations of the above-noted embodiment can be envisions, these being described below.

First Variation

In the above-described embodiment, although the description was made for the case of varying the chopper frequency, the present invention is not restricted in this manner, and can achieve an overall improvement in charging efficiency even if the chopper frequency is fixed with the amount of electricity generated varying. In this case, as shown in FIG. 19 and FIG. 20, by setting the chopper frequency so that the shorted period duty cycle is approximately 50%, even if the amount of generated electricity varies, it is possible to maintain a high charging charge amount with a simple configuration. Further, in this case by setting the chopper frequency in accordance with the maximum amount of electricity generated by the alternating current generator (for example, in the case of a small alternating current generator and the case of a small alternating current generator), it is possible to achieve an improvement in the charging efficiency using a simple configuration.

Second Variation

In the above-described embodiment, although the description was for the case in which, when the large-capacitance capacitor 4 is charged, the N-channel FETs N1 and N2 are controlled so as to be in the off state, the present invention is not restricted in this manner, and it is possible to have the N-channel FETs N1 and N2 in the current path of the large-capacitance capacitor 4 be in the on state.

Figure 22:
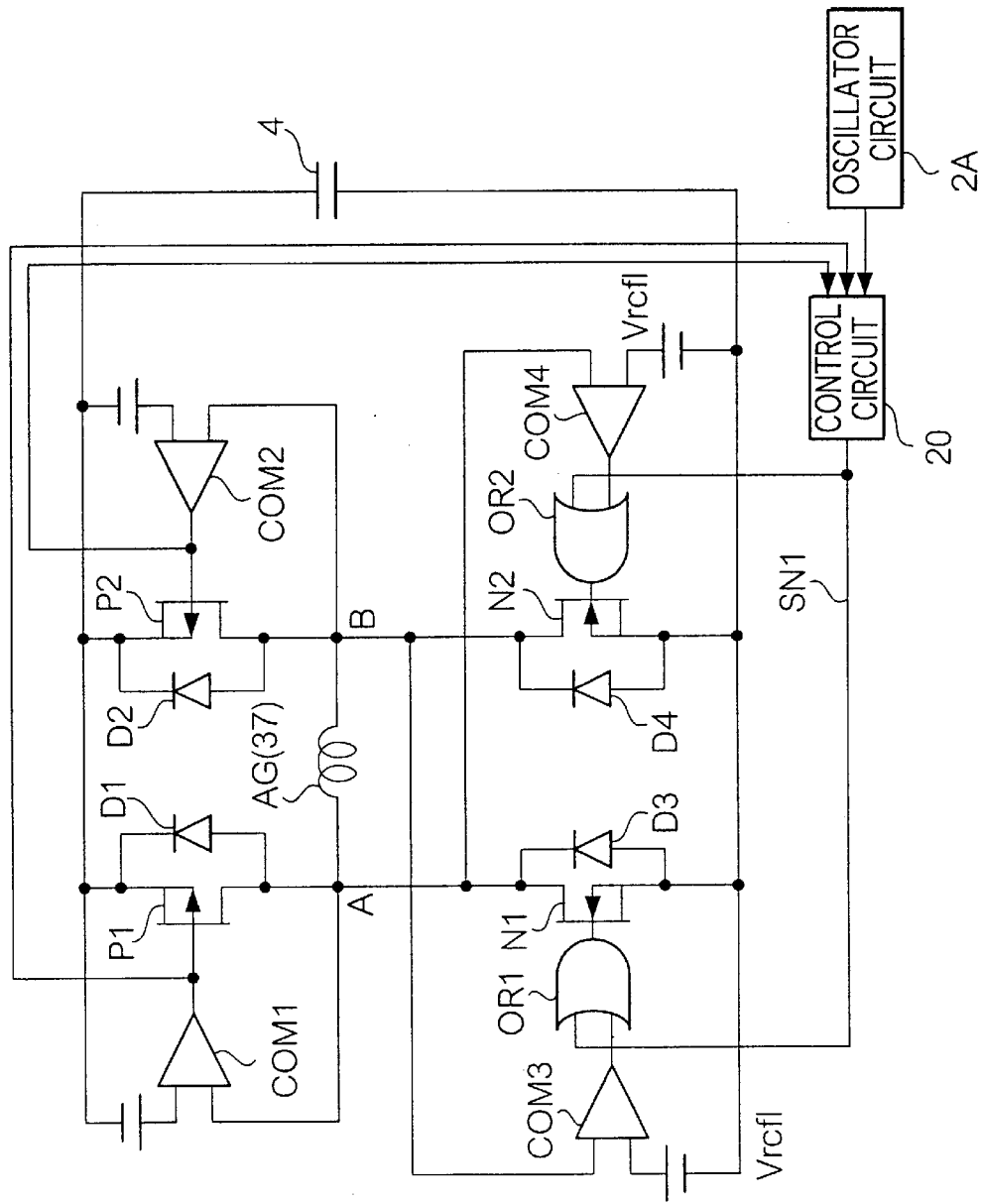
FIG. 22 is a circuit diagram of a chopper-type charging circuit of the second variation.

In this case, for example as shown in FIG. 22, it is possible to envision a method of adding comparators COM3 and COM4 for comparing the voltages at terminals A and B, respectively, of the alternating current generator AG with a reference voltage, and OR circuits OR1 and OR2 (second controller) that calculate the logical sum of the output signal SN1 of the control circuit 20 with the output signals of the comparators COM3 and COM4, respectively, and supplying output signals of the OR circuits OR1 and OR2 to the gates of the N-channel FETs N1 and N2.

Figure 23:
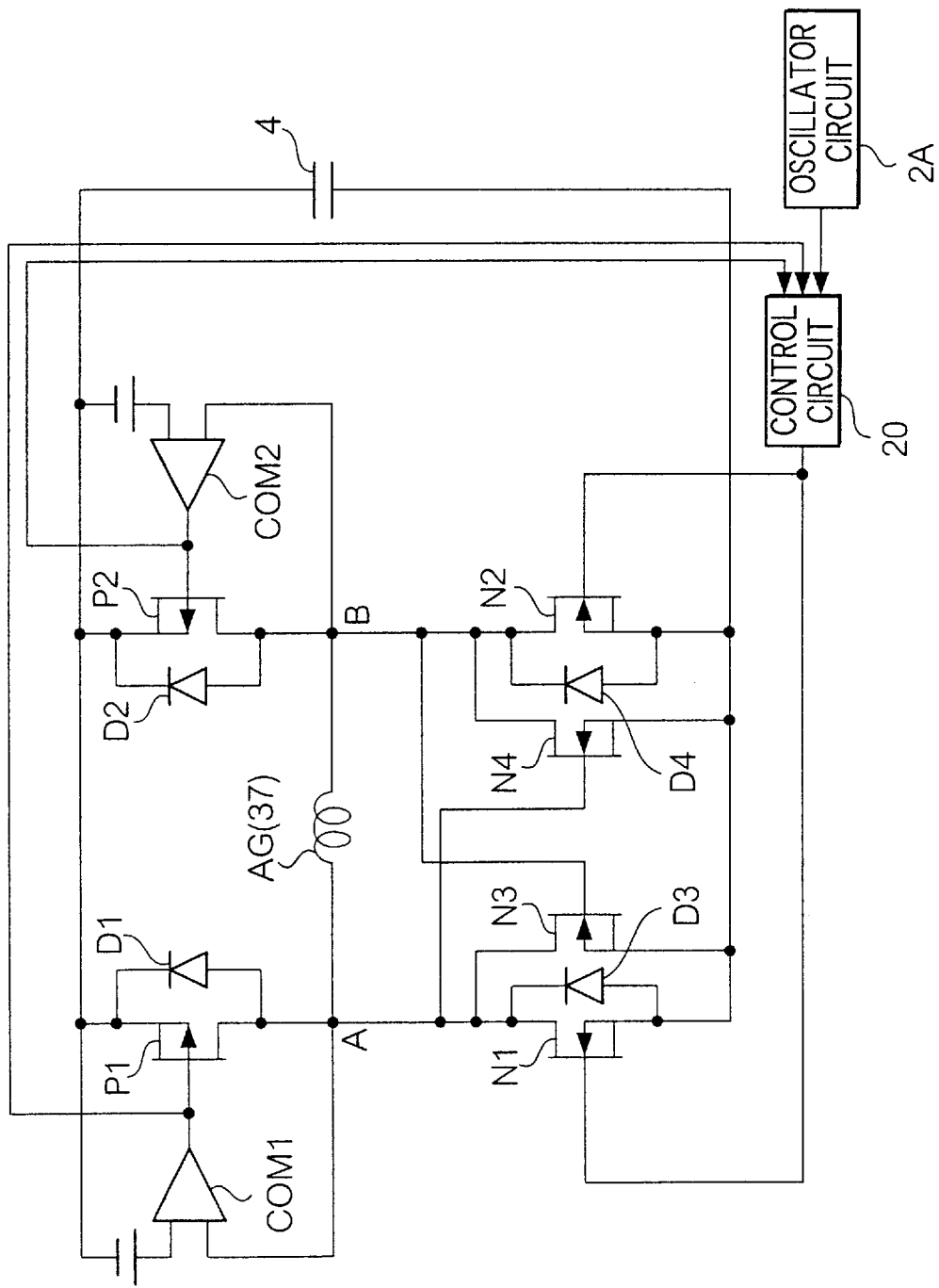
FIG. 23 is a circuit diagram of another chopper-type charging circuit of the second variation.

It is possible to envision, as shown in FIG. 23, the parallel connection of N-channel FETs N3 and N4 (second charging switches) to the N-channel FETs N1 and N2, respectively, and the supply of the voltages of the output terminals A and B of the alternating current generator AG to the gates of the N-channel FETs N3 and N4.

If this is done, it is possible to reduce the loss of the diode D3 or D4, in which the charging current flows during charging, thereby enabling an improvement in the charging efficiency of the chopper-type charging circuit.

Third Variation

In the above-described embodiment, while the description is for the case in which the electromotive force of the alternating current generator is charged, the present invention is not restricted in this manner, and it is possible to use alternating current electrical power from a commercial alternating current line, alternating current from a radio signal, or direct current electrical power from a direct current electrical generator or the like for charging.

Figure 24:
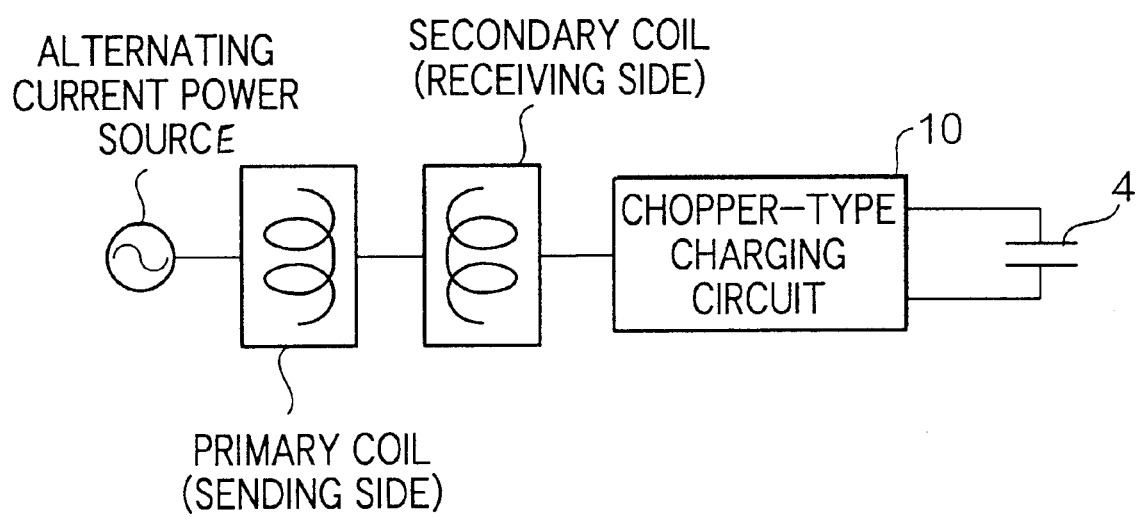
FIG. 24 is a drawing showing a non-contact method of inputting electrical power of an alternating current power source.

The method of inputting the electrical power includes the non-contact method of using an intervening coils (primary and secondary coils), as shown in FIG. 24.

Fourth Variation

In the above-described embodiment, while the description is for the example of using a P-channel field effect transistors as switching sections, the present invention is not restricted in this manner, and it is alternately possible to use PNP bipolar transistors in place of the P-channel FETs and NPN bipolar transistors in place of the N-channel FETs.

It is further possible to replace the P-channel FET P1 and P2 with diodes, in which case the comparators COM1 and COM2 detect the forward voltages of the diodes, and the respective output signals SP1 and SP2 thereof are supplied to only the controller 20.

Fifth Variation

In above-described embodiment, while the description is for the case in which the present invention is applied to a chopper-type charging circuit in which full-wave rectification is done, the present invention is not restricted in this manner, and it is possible to apply the present invention to a half-wave rectification chopper as well.

Sixth Variation

In the above-described embodiment, while the description is for the case in which the chopper-type charging circuit is applied to a wristwatch, the present invention is not restricted in this manner, and it is possible to apply the present invention to other types of clocks, to clocks incorporated within electronic equipment such as personal computers, calculators, and mobile telephones, and further to a broad range of electronic devices, such as portable sphygmomanometers, pagers, and walking step counters. It is further possible to provide in these electronic devices both a battery and a chopper-type charging circuit, with operation done on electrical power from the battery when the stored electrical power becomes small.

Seventh Variation

In the above-described embodiment, while the description is for the case in which the present invention is applied to a chopper-type charging circuit, the present invention can also be applied to a chopper circuit which simply outputs a chopper voltage.

In a chopper-type charging circuit of the present invention as described in detail above, by detecting when the transistors P1 and P2 have been off for a given amount of time, based on the comparison results from the comparators COM1 and COM2, so as to decide the end of charging and, when the decision is made that charging has ended, by setting the transistors N1 and N2 on for just a priorly established set time and then setting them to off again, it is possible to increase the charging efficiency even if there is a variation in the amount of electricity generated by the electrical generator, without increasing the power consumption.

What is claimed is:

1. A chopper circuit for generating a chopper voltage from electrical power of a power source, the chopper voltage being generated between a first line and a second line, the chopper circuit comprising:
    a comparator for comparing a voltage of the first line with a voltage of an input terminal to which electrical power of the power source is supplied;
    a switching section for charging, provided between the first line and the input terminal, which, in the case in which a comparison result from the comparator indicates that the voltage of the input terminal is equal to or greater than a prescribed voltage, causes current to flow in one direction;
    a switching section for a closed loop, provided between the second line and the input terminal, having a switching element and a unidirectional element connected in parallel with the switching element, which causes current to flow in one direction; and
    a controller controlling the switching element,
        wherein the controller has a charging end determination section for determining an end of charging by detecting that the switching section for charging has been off for a given amount of time, based on a comparison result of the comparator, and a switching element controller, which, in a case in which a decision is made by the charging end determination section that charging has ended, places the switching element in an on state for a priorly established amount of time.

2. A chopper circuit according to claim 1, further comprising a second controller, provided between the second line and another input terminal to which electrical power from the power source is supplied, which, in a case in which a voltage of the other input terminal exceeds a prescribed voltage, places the switching element in an on state.

3. A chopper circuit according to claim 1, further comprising a second switching section for charging, connected in parallel with the switching section for a closed loop, wherein the second switching section for charging switches a connection state responsive to a voltage of the other input terminal to which electrical power from the power source is supplied.

4. A chopper circuit according to claim 1, wherein the switching element controller comprises:
    a time setting section for generating a signal which switches the switching element on, by dividing frequency of a clock signal; and
    a closed loop inhibiting circuit, which forcibly places the switching element in the off state from a time at which the switching section for charging is switched on until a time at which the charging end determination section decides that charging has ended,
        wherein in a case in which the charging end determination section decides that charging has ended, clock signal frequency division operation in the time setting section is reset, and the switching element is set on for only an amount of time set based on a frequency-divided signal generated by the time setting section.

5. A chopper circuit according to claim 1, wherein the switching section for charging comprises:
    a switching element controlled based on a comparison result of the comparator for electromotive force detection; and
    a unidirectional element, connected in parallel with the switching element, which causes current to flow in one direction.

6. A chopper circuit according to claim 1, wherein the switching section for charging is a diode.

7. The chopper circuit according to claim 1, wherein the power source is an electrical generator.

8. A chopper circuit according to claim 1, wherein the power source is an alternating current generator, including a generator coil, and the set time is in a range of ±30% with respect to a value obtained by multiplying the quotient obtained by dividing a value of inductance of the generator coil by an internal resistance of the generator coil by a coefficient of 0.693.

9. A chopper circuit according to claim 1, wherein the first line is a high-voltage side line, and wherein the second line is a low-voltage side line.

10. A chopper circuit according to claim 1, wherein the switching elements are field-effect transistors, and wherein the unidirectional elements are parasitic diodes of the field-effect transistors.

11. A chopper circuit for generating a chopper voltage from electrical power of an alternating current power source, the chopper voltage being generated between a first line and a second line, the chopper circuit comprising:
    a first comparator for comparing a voltage of the first line with a voltage of one input terminal to which electrical power of the alternating current power source is supplied;
    a first switching section, provided between the first line and the one input terminal, which, in a case in which a voltage of the one input terminal is equal to or greater than a prescribed voltage, causes current to flow in one direction;
    a second comparator for comparing a voltage of the first line with another input terminal to which electrical power of the alternating current power source is supplied;
    a second switching section, provided between the first line and the other input terminal, which, in a case in which a voltage of the other input terminal is equal to or greater than a prescribed voltage, causes current to flow in one direction;
    a third switching section, provided between the second line and the one input terminal, having a switching element and a unidirectional element connected in parallel with the switching element, which causes current to flow in one direction;

a fourth switching section, provided between the second line and the other input terminal, having a switching element and a unidirectional element connected in parallel with the switching element, which causes current to flow in one direction; and a controller controlling the switching elements in the third and the fourth switching sections, wherein the controller comprises a charging end determination section for determining end of charging by detecting that the first and second switching sections have been off for a given amount of time, based on comparison results of the first and second comparators, and a switching element controller, which, in a case in which a decision is made by the charging end determination section that charging has ended, places the switching elements in the third and fourth switching sections in the on state for a priorly established amount of time.

12. A chopper circuit according to claim 11, further comprising:

a second controller, provided between the second line and the other input circuit, which, in a case in which a voltage of the other input terminal is equal to or greater than a prescribed voltage, places the switching element in the third switching section in the on state; and a third controller, provided between the second line and the one input terminal, which, in a case in which a voltage of the one input terminal is equal to or greater than a prescribed voltage, places the switching element in the fourth switching section in the on state.

13. A chopper circuit according to claim 11, further comprising:

a fifth switching section connected in parallel with the third switching section; and a sixth switching section connected in parallel with the fourth switching section, wherein the fifth switching section switches a connection state responsive to a voltage of the other input terminal, and wherein the sixth switching section switches a connection state responsive to a voltage of the one input terminal.

14. A chopper circuit according to claim 11, wherein the switching element controller comprises:

a time setting section for generating a signal that switches the switching elements of the third and fourth switching sections on, by frequency division of a clock signal; and a closed loop inhibiting section, which forcibly places the switching elements of the third and the fourth switching section in the off state from a time at which the first and the second switching sections are switched on until a time at which the charging end determination section decides that charging has ended, wherein in a case in which the charging end determination section decides that charging has ended, the clock signal frequency division operation is reset, and the switching elements in the third and the fourth switching section are set on for only an amount of time based on a frequency-divided signal generated by the time setting section.

15. A chopper circuit according to claim 11, wherein the first switching section comprises:

a switching element controlled based on a comparison result of the first comparator; and a unidirectional element connected in parallel to the switching element and causing current to flow in one direction, and wherein the second switching section comprises:

a switching element controlled based on a comparison result of the second comparator; and a unidirectional element connected in parallel with the switching element and causing a current to flow in one direction.

16. A chopper circuit according to claim 11, wherein the first and the second switching sections are diodes.

17. A chopper circuit according to claim 11, wherein the alternating current power source is an alternating current generator.

18. A chopper circuit according to claim 11, wherein the alternating current power source is an alternating current generator, including a generator coil, the set time is in a range of ±30% with respect to a value obtained by multiplying the quotient obtained by dividing a value of inductance of the generator coil by an internal resistance of the generator coil by a coefficient of 0.693.

19. A chopper circuit according to claim 11, wherein the first line is a high-voltage side line, and wherein the second line is a low-voltage side line.

20. A chopper circuit according to claim 11, wherein the switching elements are field-effect transistors, and wherein the unidirectional elements are parasitic diodes of the field-effect transistors.

21. A method for controlling a chopper circuit including a comparator circuit for comparing a voltage of a first line with a voltage of an input terminal to which electrical power of a power source is supplied; a switching circuit for charging provided between the first line and the input terminal, which, in a case in which a comparison result from the comparator circuit is that the voltage of the input terminal is equal to or greater than a prescribed voltage, causes current to flow in one direction; a switching circuit for a closed loop, provided between a second line and the input terminal, having a switching element and a unidirectional element connected in parallel with the switching element, which causes current to flow in one direction; and a control circuit for controlling the switching element, wherein a chopper voltage is generated from electrical power of the power source, the chopper voltage being generated between the first line and the second line, the method comprising:

deciding, on the basis of a comparison result from the comparator circuit, whether or not the switching circuit for charging has been off for a given amount of time; and activating the switching element of the switching circuit for the closed loop into the on state for a predetermined time period when the decision is affirmative.

22. A method according to claim 21, wherein the power source is an alternating current generator, including a generator coil, the set time is in a range of ±30% with respect to a value obtained by multiplying the quotient obtained by dividing a value of inductance of the generator coil by an internal resistance of the generator coil by a coefficient of 0.693.

23. A method for controlling a chopper circuit including a comparator circuit for comparing a voltage of a first line with a voltage of an input terminal to which electrical power of a power source is supplied; a switching circuit for charging, provided between the first line and the input terminal, which, in a case in which a comparison result from the comparator circuit is that the voltage of the input terminal is equal to or greater than a prescribed voltage, causes current to flow in one direction; a switching circuit for a closed loop, provided between a second line and the input terminal, having a switching element and a unidirectional element connected in parallel with the switching element, which causes current to flow in one direction; and a control circuit for controlling the switching element for the closed loop based on a frequency divided signal of an internal frequency division circuit, wherein a chopper voltage is generated from electrical power of the power source, the chopper voltage being generated between the first line and the second line, the method comprising:
deactivating the switching element into the off state compulsorily from a time at which the switching circuit for charging is switched on until a decision is made that charging has ended;
resetting the internal frequency division circuit, so as to stop the clock signal frequency division operation when it is decided that charging has ended; and
activating the switching element into the on state for a predetermined time period when it is decided that charging has ended.

24. A method according to claim 23, wherein the power source is an alternating current generator, including a generator coil, the set time is in a range of ±30% with respect to a value obtained by multiplying the quotient obtained by dividing a value of inductance of the generator coil by an internal resistance of the generator coil by a coefficient of 0.693.

25. A method for controlling a chopper circuit including a first comparator circuit comparing a voltage of a first line with a voltage of one input terminal to which electrical power of an alternating current power source is supplied; a first switching circuit, provided between the first line and the one input terminal, which, in a case in which the voltage of the one input terminal is equal to or greater than a prescribed voltage, causes current to flow in one direction; a second comparator circuit comparing a voltage of a first line with a voltage of another input terminal to which electrical power of an alternating current power source is supplied; a second switching circuit, provided between the first line and the another input terminal, which, in a case in which the voltage of the another input terminal is equal to or greater than a prescribed voltage, causes current to flow in one direction; a third switching circuit, provided between the second line and the one input terminal, having a switching element and a unidirectional element connected in parallel with the switching element, which causes current to flow in one direction; a fourth switching circuit, provided between the second line and the another input terminal, having a switching element and a unidirectional element connected in parallel with the switching element, which causes current to flow in one direction; and a control circuit controlling the switching elements of the third and fourth switching circuits, wherein a chopper voltage is generated from electromotive force of the alternating current power source, the chopper voltage being generated between the first line and the second line, the method comprising:
deciding, based on comparison results of the first and the second comparator circuits, whether or not the first and the second switching circuits have been off for a given amount of time; and
activating the switching elements of the third and the fourth switching circuits into the on state for a predetermined time period when the decision is affirmative.

26. A method according to claim 25, wherein the alternating current power source is an alternating current generator, including a generator coil, the set time is in a range of ±30% with respect to a value obtained by multiplying the quotient obtained by dividing a value of inductance of the generator coil by an internal resistance of the generator coil by a coefficient of 0.693.

27. A method for controlling a chopper circuit including a first comparator circuit comparing a voltage of a first line with a voltage of one input terminal to which electrical power of an alternating current power source is supplied; a first switching circuit provided between the first line and the one input terminal, which, in a case in which the voltage of the one input terminal is equal to or greater than a prescribed voltage, causes current to flow in one direction; a second comparator circuit comparing a voltage of a first line with a voltage of another input terminal to which electrical power of an alternating current power source is supplied; a second switching circuit, provided between the first line and the another input terminal, which, in a case in which the voltage of the another input terminal is equal to or greater than a prescribed voltage, causes current to flow in one direction; a third switching circuit, provided between the second line and the one input terminal, having a switching element and a unidirectional element connected in parallel with the switching element, which causes current to flow in one direction; a fourth switching circuit, provided between the second line and the another input terminal, having a switching element and a unidirectional element connected in parallel with the switching element, which causes current to flow in one direction; and a control circuit controlling the switching elements of the third and fourth switching circuits based on a frequency divided signal of an internal frequency division circuit, wherein a chopper voltage is generated from electromotive force of the alternating current power source, the chopper voltage being generated between the first line and the second line, the method comprising:
deactivating the switching element into the off state compulsorily from a time at which the switching elements of the first and second switching circuits are switched on until a decision is made that charging has ended;
resetting the internal frequency division circuit, so as to stop the clock signal frequency division operation when it is decided that charging has ended; and
activating the switching elements in the third and fourth switching circuits into the on state for a predetermined time period when it is decided that charging has ended.

28. A method according to claim 27, wherein the alternating current power source is an alternating current generator, including a generator coil, the set time is in a range of ±30% with respect to a value obtained by multiplying the quotient obtained by dividing a value of inductance of the generator coil by an internal resistance of the generator coil by a coefficient of 0.693.

29. A chopper-type charging circuit comprising a chopper circuit according to claim 1, and a storage section storing electricity of a chopper voltage of the chopper circuit.

30. An electronic device internally incorporating a chopper-type charging circuit according to claim 29, which operates by electrical power supplied from the chopper-type charging circuit.

31. A timekeeping apparatus comprising a chopper-type charging circuit according to claim 29, wherein time is kept by electrical power supplied from the chopper-type charging circuit.

32. A chopper-type charging circuit comprising a chopper circuit according to claim 11, and a storage battery that stores a chopper voltage of the chopper circuit.

33. An electronic device internally incorporating a chopper-type charging circuit according to claim 32, which operates by electrical power supplied from the chopper-type charging circuit.

34. A timekeeping apparatus comprising a chopper-type charging circuit according to claim 32, and a timekeeping display displaying time that is kept by electrical power supplied from the chopper-type charging circuit.

* * * * *